United States Patent
Gruber

(10) Patent No.: US 9,818,170 B2
(45) Date of Patent: Nov. 14, 2017

(54) PROCESSING UNALIGNED BLOCK TRANSFER OPERATIONS

(71) Applicant: QUALCOMM Incorporated, San Diego, CA (US)

(72) Inventor: Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 14/566,423

(22) Filed: Dec. 10, 2014

(65) Prior Publication Data

US 2016/0171644 A1 Jun. 16, 2016

(51) Int. Cl.
*G06T 1/60* (2006.01)
*G06F 13/28* (2006.01)
*G06T 1/20* (2006.01)

(52) U.S. Cl.
CPC .............. *G06T 1/60* (2013.01); *G06F 13/28* (2013.01); *G06T 1/20* (2013.01); *G06T 2200/28* (2013.01); *Y02B 60/1228* (2013.01)

(58) Field of Classification Search
CPC .... G06F 13/28; G06F 9/3816; G06F 9/30043; G06F 9/3824; G06F 3/14; G06F 9/30036;

(Continued)

(56) References Cited

U.S. PATENT DOCUMENTS

| 4,641,197 A | * | 2/1987 | Miyagi | G06T 1/0007 358/450 |
| 4,903,217 A | * | 2/1990 | Gupta | G09G 5/39 345/545 |

(Continued)

FOREIGN PATENT DOCUMENTS

| EP | 1840751 A1 | 10/2007 |
| EP | 2096551 A1 | 9/2009 |

(Continued)

OTHER PUBLICATIONS

International Search Report and Written Opinion from International Application No. PCT/US2015/059450, dated Jan. 22, 2016, 10 pp.

(Continued)

*Primary Examiner* — Sultana M Zalalee
(74) *Attorney, Agent, or Firm* — Schumaker & Sieffert, P.A.

(57) ABSTRACT

This disclosure describes techniques for processing unaligned block transfer (BLT) commands. The techniques of this disclosure may involve converting an unaligned BLT command into multiple aligned BLT commands, where the multiple aligned BLT commands may collectively produce the same resulting memory state as that which would have been produced by the unaligned BLT command. The techniques of this disclosure may allow the benefits of relatively low-power GPU-accelerated BLT processing may be achieved for unaligned BLT commands without requiring a CPU to pre-process and/or post-process the underlying unaligned surfaces. In this way, the performance and/or power consumption associated with processing unaligned BLT commands in an alignment-constrained GPU-based system may be improved.

28 Claims, 10 Drawing Sheets

EVEN BLT

(58) Field of Classification Search
CPC .. G06F 12/04; G06F 12/0607; G06F 12/0879; G06F 12/10; G06F 13/4013; G06F 13/4018; G06F 3/0689; G06F 5/10; G06F 9/30014; G06F 9/30032; G06F 9/03; G09G 5/363; G09G 2360/121; G09G 2360/127; G09G 2370/047; G09G 5/39; G09G 5/397; G06T 1/20; G06T 1/60; G06T 2200/28; H04L 49/35
See application file for complete search history.

(56) References Cited

U.S. PATENT DOCUMENTS

| | | | |
|---|---|---|---|
| 5,218,674 A * | 6/1993 | Peaslee | G06F 9/30032 345/562 |
| 5,251,298 A * | 10/1993 | Nally | G06F 9/3877 345/555 |
| 5,724,497 A * | 3/1998 | San | G06T 17/00 345/469 |
| 5,801,717 A * | 9/1998 | Engstrom | G09G 5/006 345/422 |
| 6,031,550 A * | 2/2000 | Larson | G06T 11/20 345/503 |
| 6,065,070 A | 5/2000 | Johnson | |
| 6,411,302 B1 | 6/2002 | Chiraz | |
| 6,542,909 B1 * | 4/2003 | Tamer | G06F 9/4435 707/756 |
| 6,587,112 B1 | 7/2003 | Goeltzenleuchter et al. | |
| 6,900,813 B1 | 5/2005 | Stefanidis | |
| 7,050,060 B1 | 5/2006 | Ohara et al. | |
| 7,120,317 B1 * | 10/2006 | Wu | G06T 3/606 345/658 |
| 7,769,965 B2 | 8/2010 | Couvert et al. | |
| 8,031,197 B1 | 10/2011 | Williams et al. | |
| 2004/0085322 A1 * | 5/2004 | Alcorn | G06T 15/005 345/562 |
| 2004/0098556 A1 * | 5/2004 | Buxton | G06F 9/3001 711/201 |
| 2004/0186980 A1 * | 9/2004 | Ansari | G06F 9/30043 712/4 |
| 2005/0273564 A1 * | 12/2005 | Lakshmanamurthy | G06F 13/1694 711/158 |
| 2006/0271721 A1 | 11/2006 | Beukema et al. | |
| 2011/0087859 A1 * | 4/2011 | Mimar | G06F 9/30043 712/4 |

FOREIGN PATENT DOCUMENTS

| | | |
|---|---|---|
| GB | 2230117 A | 10/1990 |
| WO | 9934273 A2 | 7/1999 |
| WO | 2004104846 A2 | 12/2004 |

OTHER PUBLICATIONS

Response to the Written Opinion dated Jan. 22, 2016, from International Application No. PCT/US2015/059450, dated Jun. 16, 2016, 22 pp.

Response to the Second Written Opinion dated Aug. 4, 2016, from International Application No. PCT/US2015/059450, dated Sep. 28, 2016, 5 pp.

International Preliminary Report on Patentability from International Application No. PCT/US2015/059450, dated Jan. 5, 2017, 6 pp.

* cited by examiner

SINGLE BLT

TWO BLT CONVERSION

PROCESSING UNALIGNED BLOCK TRANSFER OPERATIONS

TECHNICAL FIELD

This disclosure relates to graphics processing, and more particularly, to techniques for performing block transfer (BLT) operations with a graphics processor.

BACKGROUND

Graphics processing units (GPUs) often perform BLT operations to copy a region of a source surface to a region of a destination surface, or to composite corresponding regions of multiple source surfaces into a single corresponding region of a destination surface. A GPU may include specialized hardware for writing and reading surfaces to and from memory as part of the BLT operation. The GPU hardware for writing and reading surfaces may have various alignment constraints that need to be satisfied in order to successfully service a BLT command. If a BLT command does not satisfy such alignment constraints, then the GPU hardware may not be able to service the BLT command.

SUMMARY

This disclosure describes techniques for processing unaligned BLT commands. An unaligned BLT command may refer to a BLT command that does not satisfy the alignment constraints of an alignment-constrained GPU, and therefore may not be able to be processed by the GPU. The techniques of this disclosure may involve converting an unaligned BLT command into multiple aligned BLT commands, where the multiple aligned BLT commands may collectively produce the same resulting memory state as that which would have been produced by the unaligned BLT command. However, unlike the unaligned BLT command, the multiple aligned BLT commands may satisfy the alignment constraints of the GPU, and therefore be able to be processed by the GPU.

Using a GPU to process BLT commands may accelerate the execution of a BLT command and/or reduce the power consumption associated with execution of a BLT command relative to using a central processing unit (CPU). Therefore, by converting the unaligned BLT command into multiple aligned BLT commands, the benefits of relatively low-power GPU-accelerated BLT processing may be achieved for unaligned BLT commands without requiring a CPU to pre-process and/or post-process the underlying unaligned surfaces. In this way, the performance and/or power consumption associated with processing unaligned BLT commands in an alignment-constrained GPU-based system may be improved.

In one example, this disclosure describes a method that includes converting, with one or more processors, an unaligned BLT command into multiple aligned BLT commands.

In another example, this disclosure describes a device that includes one or more processors configured to convert an unaligned BLT command into multiple aligned BLT commands.

In another example, this disclosure describes an apparatus that includes means for receiving an unaligned BLT command. The apparatus further includes means for converting the unaligned BLT command into multiple aligned BLT commands.

In another example, this disclosure describes a computer-readable storage medium storing instructions that, when executed, cause one or more processors to convert an unaligned BLT command into multiple aligned BLT commands.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
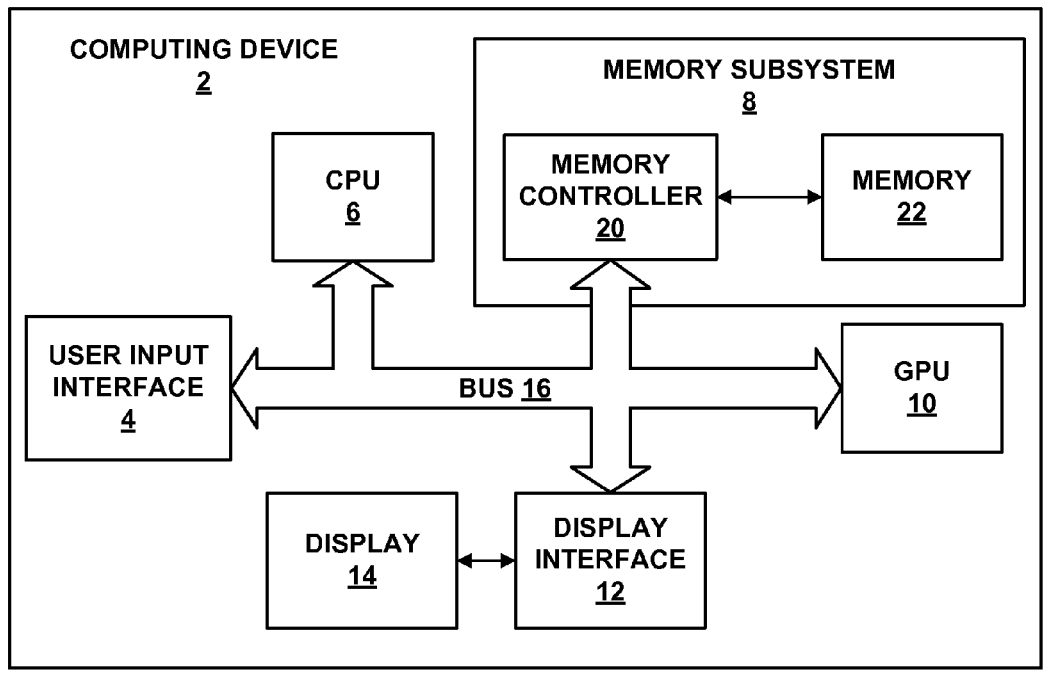
FIG. 1 is a block diagram illustrating an example computing device that may be used to implement the BLT operation processing techniques of this disclosure.

This disclosure describes techniques for processing unaligned block transfer (BLT) commands. An unaligned BLT command may refer to a BLT command that does not satisfy the alignment constraints of an alignment-constrained graphics processing unit (GPU), and therefore may not be able to be processed by the GPU. The techniques of this disclosure may involve converting an unaligned BLT command into multiple aligned BLT commands, where the multiple aligned BLT commands may collectively produce the same resulting memory state as that which would have been produced by the unaligned BLT command. However, unlike the unaligned BLT command, the multiple aligned BLT commands may satisfy the alignment constraints of the GPU, and therefore be able to be processed by the GPU.

Using a GPU to process BLT commands may accelerate the execution of a BLT command and/or reduce the power consumption associated with execution of a BLT command relative to using a central processing unit (CPU). Therefore, by converting the unaligned BLT command into multiple aligned BLT commands, the benefits of relatively low-power GPU-accelerated BLT processing may be achieved for unaligned BLT commands without requiring a CPU to pre-process and/or post-process the underlying unaligned surfaces. In this way, the performance and/or power consumption associated with processing unaligned BLT commands in an alignment-constrained GPU-based system may be improved.

A BLT command may refer to a command that instructs a GPU to perform a BLT operation. A BLT operation may refer to an operation that involves copying a region of a source surface to a region of a destination surface, or compositing corresponding regions of multiple source surfaces into a single corresponding region of a destination surface. The regions of the source surfaces may be referred to as source regions, and the region of the destination surface may be referred to as the destination region. The source and destination regions may be alternatively referred to as BLT regions and/or copy regions to indicate that the copying and compositing takes place with respect to pixels within those regions. Each of the BLT regions may be a contiguous subset of a surface that includes the respective BLT region. In some examples, the BLT regions may be rectangular regions.

A GPU may include specialized hardware for writing and reading surfaces to and from memory as part of the BLT operation. The hardware may have alignment constraints that require the beginning of each line of a surface to correspond to a memory address that is an integer multiple of a predetermined alignment width. A surface that satisfies the alignment constraints is said to be an aligned surface, while a surface that does not satisfy the alignment constraints is said to be an unaligned surface.

Oftentimes, a compiler or application may have access to the alignment constraints of the particular GPU hardware that will be performing BLT operations, and may therefore generate BLT instructions based on the alignment constraints so that the resulting surfaces are aligned. However, not all systems make the alignment constraints of the GPU available to the compiler or application. Or even if available, some compilers or applications may determine not to optimize the generated code to satisfy such alignment constraints for various reasons (e.g., to reduce complexity of the compiler or application).

If one or more surfaces for a BLT operation do not satisfy the alignment constraints of the GPU hardware, then a GPU driver may not be able to directly use the GPU to accelerate the performance of the BLT operation. Instead, the GPU driver may need to perform the BLT operation with a central processing unit (CPU). In other cases, the GPU driver may use the CPU to copy the unaligned surface into an aligned surface, use the GPU to perform the BLT operation on the aligned surface, and use the CPU to copy the result of the BLT operation back into an unaligned surface. In either case, using the CPU to perform the BLT operation itself or to transform between unaligned and aligned surfaces increases the power consumption of and reduces the performance of the BLT operation.

An aligned BLT command may refer to a BLT command where all of the surfaces associated with the BLT command are aligned surfaces. An unaligned BLT command may refer to a BLT command where at least one of the surfaces is an unaligned surface. Similarly, an aligned BLT operation may refer to a BLT operation where all of the surfaces associated with the BLT operation are aligned surfaces, and an unaligned BLT operation may refer to a BLT command where at least one of the surfaces is an unaligned surface.

Conceptually, an aligned surface may refer to a surface where the beginning of each line of the surface corresponds to a memory address that is an integer multiple of a predetermined alignment width. The predetermined alignment width may, in some examples, correspond to an alignment width that is required by the GPU memory access hardware for proper execution of a BLT operation. An alignment boundary may refer to a memory address that is an integer multiple of the predetermined alignment width.

A surface may be defined by a surface pointer, a surface width parameter, and a surface height parameter. The surface pointer may indicate (or point to) a memory address that corresponds to the start of the surface. The surface width parameter (or stride parameter) may indicate the width of each line in the surface. The surface height parameter may indicate how many lines are included in the surface.

An aligned surface may refer to a surface where: (1) the surface pointer points to an alignment boundary; and (2) the surface width is an integer multiple of the alignment width. If either of these conditions is not satisfied, then the surface is said to be unaligned.

According to a first aspect of this disclosure, in cases where condition (1) is satisfied and condition (2) is not satisfied (i.e., the surface width for the underlying surfaces of a BLT command is not an integer multiple of the alignment width), a graphics driver may, for each of the source and destination surfaces associated with the BLT command, combine multiple lines of the respective surface into a single line to form an aligned virtual surface that has a surface width which is an integer multiple of the alignment width. Because the surface width for the virtual surface is an integer multiple of the alignment width, the virtual surface is an aligned surface that may be processed by an alignment-constrained GPU.

However, combining lines to form a virtual surface may cause the BLT regions (i.e., the regions to be copied and/or composited) to be transformed such that they are no longer contiguous regions (e.g., no longer a single, contiguous rectangle). For example, if a source BLT region associated with an incoming BLT command is a single contiguous rectangle, transforming the source surface into a virtual source surface may transform the source BLT region into two separate rectangles that may not be contiguous with each other. Typically, a single BLT operation cannot be performed for a non-contiguous BLT region.

To address this issue, the graphics driver may determine contiguous subsets of the transformed BLT region, and generate multiple BLT commands, where each of the BLT commands causes the GPU to perform a BLT operation for a respective one of the contiguous subsets of the transformed BLT region. For example, in the case where a rectangular source BLT region is transformed into two rectangular source BLT regions, the graphics driver may generate a first BLT command for the first rectangular source BLT region, and a second BLT command for the second rectangular source BLT region.

Each of the source and destination surfaces for the multiple BLT commands may correspond to one or more aligned virtual surfaces, thereby causing the multiple BLT commands to be aligned BLT commands. The multiple aligned BLT commands may collectively process the entire source and destination BLT regions, thereby producing the same resulting memory state as that which would have been produced by the single, unaligned BLT command. In this way, a graphics driver may convert an unaligned BLT command into multiple aligned BLT commands that can be serviced by an alignment-constrained GPU.

According to a second aspect of this disclosure, in cases where both conditions (1) and (2) are not satisfied (i.e., the surface pointer does not point to an alignment boundary and the surface width for the underlying surfaces of a BLT command is not an integer multiple of the alignment width), the graphics driver may widen the width of the unaligned surface in a manner similar to what was described above with respect to the first aspect of this disclosure. This will cause the widened surface width to correspond to the alignment width. However, because the surface pointer of the widened surface does not begin at an alignment boundary, the widened surface is still not aligned.

One approach for addressing this issue is to shift the surface pointer such that the shifted surface pointer points to the nearest alignment boundary. Similar to what was described above with respect to the first aspect of this disclosure, widening the surface may transform the BLT region into a plurality of contiguous subsets, and the graphics driver may generate multiple BLT commands, where each of the BLT commands causes the GPU to perform a BLT operation for a respective one of the contiguous subsets of the transformed BLT region. However, if the width of the virtual surface remains the same, shifting the surface pointer may cause transformed BLT region subsets that are near the border of the surface to wrap around the edges of the virtual surface. In other words, such transformed BLT region subsets may no longer be contiguous, and may not be able to be serviced by a single BLT operation.

To address this issue, the graphics driver may generate two virtual surfaces for each of the source and destination surfaces. The two virtual surfaces may have the same widened surface width, but separate aligned surface pointers. The surface pointers for each of the virtual surfaces may correspond to alignment boundaries that are on either side of the unaligned surface pointer. For example, the GPU driver may generate a surface pointer for a first virtual surface that points to an alignment boundary that is less than the unaligned surface pointer, and generate a surface pointer for a second virtual surface that points to an alignment boundary that is greater than the unaligned surface pointer.

If a transformed BLT region subset wraps around the edge of the one of the virtual surfaces, then it will not wrap around the edge of the other virtual surface. Therefore, when generating the BLT commands for each of the transformed BLT region subsets, the graphics driver may select virtual surfaces for the respective BLT commands where the corresponding transformed BLT region subsets do not wrap around the edges of the virtual surface. In other words, the graphics driver may select virtual surfaces that allow each of the transformed BLT region subsets to be represented as a contiguous region (e.g., a contiguous rectangular region).

Each of the source and destination surfaces for the multiple BLT commands may correspond to one of a plurality of aligned virtual surfaces, thereby causing the multiple BLT commands to be aligned BLT commands. The multiple aligned BLT commands may collectively process the entire source and destination BLT regions, thereby producing the same resulting memory state as that which would have been produced by the single, unaligned BLT command.

Unlike the unaligned BLT command, the multiple aligned BLT commands may be able to be processed by an alignment-constrained graphics processing unit (GPU), which may be able to accelerate the execution of a BLT command and/or reduce the power consumption associated with execution of the BLT command relative to a central processing unit (CPU). By converting the unaligned BLT command into multiple aligned BLT commands, the benefits of relatively low-power GPU-accelerated BLT processing may be achieved for unaligned BLT commands without requiring a CPU to pre-process and/or post-process the underlying unaligned surfaces. In this way, the performance and/or power consumption associated with processing unaligned BLT commands may be improved.

FIG. 1 is a block diagram illustrating an example computing device 2 that may be used to implement the BLT operation processing techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile phone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a CPU 6, a memory subsystem 8, a GPU 10, a display interface 12, a display 14 and a bus 16. User input interface 4, CPU 6, memory subsystem 8, GPU 10 and display interface 12 may communicate with each other using bus 16. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

User input interface 4 may allow one or more user input devices (not shown) to be communicatively coupled to computing device 2. The user input devices may allow a user to provide input to computing device 2 via user input interface 4. Example user input devices include a keyboard, a mouse, a trackball, a microphone, a touch pad, a touch-sensitive or presence-sensitive display, or another input device. In examples where a touch-sensitive or presence-sensitive display is used as a user input device, all or part of user input interface 4 may be integrated with display 14.

CPU 6 may comprise a general-purpose or a special-purpose processor that controls operation of computing device 2. CPU 6 may execute one or more software applications. The software applications may include, for example, a video game application, a graphics application, a word processor application, an email application, a spread sheet application, a media player application, a graphical user interface application, an operating system, or any other type of software application or program.

The software applications that execute on CPU 6 may include one or more graphics rendering instructions that instruct GPU 10 to cause the rendering of graphics data to display 14. In some examples, the software instructions may conform to a graphics application programming interface (API), such as, e.g., an Open Graphics Library (OpenGL®) API, an Open Graphics Library Embedded Systems (OpenGL ES) API, a Direct3D API, a DirectX API, a RenderMan API, a WebGL API, or any other public or proprietary standard graphics API. In order to process the graphics rendering instructions, CPU 6 may issue one or more graphics rendering commands to GPU 10 to cause GPU 10 to perform some or all of the rendering of the graphics data. In some examples, the graphics data to be rendered may include a list of graphics primitives, e.g., points, lines, triangles, quadrilaterals, triangle strips, patches, etc.

Memory subsystem 8 may be configured to service memory access requests received from other components within computing device 2. For example, memory subsystem 8 may service memory access requests from CPU 6, GPU 10, and/or display interface 12. The memory access requests may include read access requests and write access requests. Memory subsystem 8 is communicatively coupled to CPU 6, GPU 10, user input interface 4, and display interface 12 via bus 16.

Memory subsystem 8 includes a memory controller 20 and a memory 22. Memory controller 20 facilitates the transfer of data going into and out of memory 22. For example, memory controller 20 may receive memory read requests and memory write requests from CPU 6 and/or GPU 10, and service such requests with respect to memory 22 in order to provide memory services for the components in computing device 2.

Memory controller 20 is communicatively coupled to memory 22 via a dedicated memory bus, and to other components (e.g., CPU 6 and GPU 10) via bus 16. Although memory controller 20 is illustrated in the example computing device 2 of FIG. 1 as being a processing module that is separate from both CPU 6 and memory 22, in other examples, some or all of the functionality of memory controller 20 may be implemented in one or more of CPU 6, GPU 10, and memory 22.

Memory 22 may store program modules and/or instructions that are accessible for execution by CPU 6 and/or data for use by the programs executing on CPU 6. For example, memory 22 may store user applications and graphics data associated with the applications. Memory 22 may also store information for use by and/or generated by other components of computing device 2. For example, memory 22 may act as a device memory for GPU 10 and may store data to be operated on by GPU 10 as well as data resulting from operations performed by GPU 10. For example, memory 22 may store any combination of surfaces, source surfaces, destination surfaces, texture buffers, depth buffers, stencil buffers, vertex buffers, frame buffers, or the like. In addition, memory 22 may store command streams for processing by GPU 10. Memory 22 may include one or more volatile or non-volatile memories or storage devices, such as, for example, random access memory (RAM), static RAM (SRAM), dynamic RAM (DRAM), synchronous dynamic random access memory (SDRAM), read-only memory (ROM), erasable programmable ROM (EPROM), electrically erasable programmable ROM (EEPROM), Flash memory, a magnetic data media or an optical storage media. In some examples, memory 22 may be a double data rate (DDR) SDRAM, such as, e.g., a DDR1 SDRAM, a DDR2 SDRAM, a DDR3 SDRAM, a DDR4 SDRAM, etc.

GPU 10 may be configured to execute commands that are issued to GPU 10 by CPU 6. The commands executed by GPU 10 may include graphics commands, draw call commands, GPU state programming commands, BLT commands, general-purpose computing commands, kernel execution commands, etc. The BLT commands may include, e.g., memory copy commands, memory compositing commands, and blitting commands (i.e., block transfer commands).

In some examples, GPU 10 may be configured to render and display graphics data that is received from CPU 6. In such examples, CPU 6 may provide graphics data to GPU 10 for rendering to display 14 and issue one or more graphics commands to GPU 10. The graphics commands may include, e.g., draw call commands, GPU state programming commands, BLT commands, blitting commands, etc. The graphics data may include vertex buffers, texture data, surface data, etc. In some examples, CPU 6 may provide the commands and graphics data to GPU 10 by writing the commands and graphics data to memory 22, which may be accessed by GPU 10.

In further examples, GPU 10 may be configured to perform general-purpose computing for applications executing on CPU 6. In such examples, CPU 6 may provide general-purpose computing data to GPU 10, and issue one or more general-purpose computing commands to GPU 10. The general-purpose computing commands may include, e.g., kernel execution commands, BLT commands, etc. In some examples, CPU 6 may provide the commands and general-purpose computing data to GPU 10 by writing the commands and graphics data to memory 22, which may be accessed by GPU 10.

GPU 10 may, in some instances, be built with a highly-parallel structure that provides more efficient processing of vector operations than CPU 6. For example, GPU 10 may include a plurality of processing elements that are configured to operate on multiple vertices, control points, pixels and/or other data in a parallel manner. The highly parallel nature of GPU 10 may, in some instances, allow GPU 10 to render graphics images (e.g., GUIs and two-dimensional (2D) and/or three-dimensional (3D) graphics scenes) onto display 14 more quickly than rendering the images using CPU 6. In addition, the highly parallel nature of GPU 10 may allow GPU 10 to process certain types of vector and matrix operations for general-purposed computing applications more quickly than CPU 6.

GPU 10 may, in some examples, be integrated into a motherboard of computing device 2. In other instances, GPU 10 may be present on a graphics card that is installed in a port in the motherboard of computing device 2 or may be otherwise incorporated within a peripheral device configured to interoperate with computing device 2. In further instances, GPU 10 may be located on the same microchip as CPU 6 forming a system on a chip (SoC). GPU 10 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 10 may include a GPU cache, which may provide caching services for all or a portion of memory 22. In such examples, GPU 10 may use the cache to process data locally using a local storage, instead of off-chip memory. This may allow GPU 10 to operate in a more efficient manner by reducing the need of GPU 10 to access memory 22 via bus 16, which may experience heavy bus traffic. In some examples, however, GPU 10 may not include a separate cache, but instead utilize memory 22 via bus 16. The GPU cache may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 10 may store rendered image data in a frame buffer that is allocated within memory 22. Display interface 12 may retrieve the data from the frame buffer and configure display 14 to display the image represented by the rendered image data. In some examples, display interface 12 may include a digital-to-analog converter (DAC) that is configured to convert the digital values retrieved from the frame buffer into an analog signal consumable by display 14. In other examples, display interface 12 may pass the digital values directly to display 14 for processing.

Display 14 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 14 may be integrated within computing device 2. For instance, display 14 may be a screen of a mobile telephone handset or a tablet computer. Alternatively, display 14 may be a stand-alone device coupled to computing device 2 via a wired or wireless communications link. For instance, display 14 may be a computer monitor or flat panel display connected to a personal computer via a cable or wireless link.

Bus 16 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 16 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

GPU 10 may receive BLT commands, and service the BLT commands by performing corresponding BLT operations. In some cases, GPU 10 may include memory access hardware that is configured to perform the BLT operations, and this hardware may have various alignment constraints that need to be satisfied in order to successfully service a BLT operation. For example, such memory access hardware may be configured to require that some or all of the surfaces for the BLT operation be aligned.

For a surface to be aligned, the memory access hardware may require that (1) the surface pointer for the surface points to an alignment boundary; and (2) the surface width for the surface is an integer multiple of the alignment width. If either of these conditions is not satisfied, then the surface is said to be unaligned.

In some cases, a software application that is executing on CPU 6 may issue unaligned BLT commands. Unaligned BLT commands may result when a compiler that compiled the software application, or the software application as written, did not have the alignment constraints available to the compiler or application at the time of compiling and/or run-time, or did not decide to optimize the generated code to satisfy the alignment constraints (e.g., to reduce complexity of the compiler or application). Because the BLT commands are unaligned, GPU 10 may not be able to directly service such commands.

According to examples of this disclosure, CPU 6 and/or GPU 10 may be configured to convert an unaligned BLT command into multiple aligned BLT commands, where the multiple aligned BLT commands may collectively produce the same resulting memory state as that which would have been produced by the unaligned BLT command. The multiple aligned BLT commands may satisfy the alignment constraints of GPU 10, and therefore be able to be processed by GPU 10. In this way, the benefits of relatively low-power GPU-accelerated BLT processing may be obtained for unaligned BLT commands, thereby improving the performance and/or power consumption associated with processing unaligned BLT commands.

Figure 2:
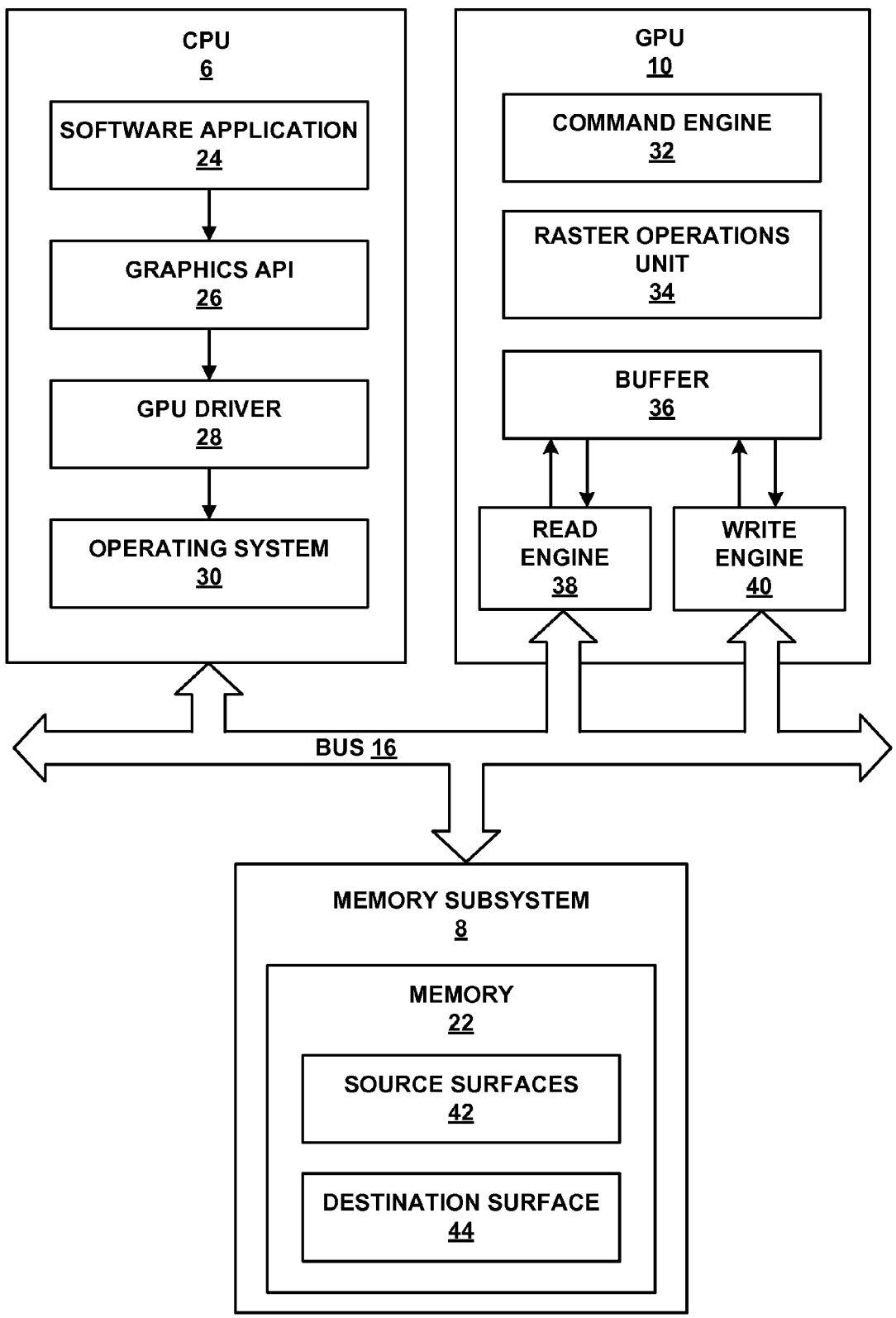
FIG. 2 is a block diagram illustrating portions of the computing device of FIG. 1 in further detail.

FIG. 2 is a block diagram illustrating portions of computing device 2 in FIG. 1 in further detail. As shown in FIG. 2, CPU 6 is communicatively coupled to GPU 10 and memory subsystem 8, and GPU 10 is communicatively coupled to CPU 6 and memory subsystem 8. GPU 10 may, in some examples, be integrated onto a motherboard with CPU 6. In additional examples, GPU 10 may be implemented on a graphics card that is installed in a port of a motherboard that includes CPU 6. In further examples, GPU 10 may be incorporated within a peripheral device that is configured to interoperate with CPU 6. In additional examples, GPU 10 may be located on the same microchip as CPU 6 forming a system on a chip (SoC).

In the example system of FIG. 2, CPU 6 executes a software application 24, a graphics API 26, a GPU driver 28 and an operating system 30. Software application 24 may include one or more instructions that cause graphics images to be displayed and/or one or more instructions that cause a non-graphics task (e.g., a general-purpose computing task) to be performed on GPU 10. In some examples, software application 24 may include one or more BLT instructions, which may be alternatively referred to as BLT commands, software BLT commands, or application BLT commands. Software application 24 may issue the instructions to graphics API 26. Graphics API 26 may be a runtime service that translates the instructions received from software application 24 into a format that is consumable by GPU driver 28.

GPU driver 28 receives the instructions from software application 24, via graphics API 26, and controls the operation of GPU 10 to service the instructions. For example, GPU driver 28 may formulate one or more commands, place the commands into memory 22, and instruct GPU 10 to execute the commands. In some examples, GPU driver 28 may place the commands into memory 22 and communicate with GPU 10 via operating system 30, e.g., via one or more system calls.

In some examples, GPU driver 28 (or another software component on CPU 6) may be configured to receive an unaligned BLT command from software application 24, and convert the unaligned BLT command into multiple aligned BLT commands according to any of the techniques described in this disclosure. GPU driver 28 may provide the multiple aligned BLT commands to GPU 10 for execution.

GPU 10 includes a command engine 32, a raster operations unit 34, a buffer 36, a read engine 38 and a write engine 40. In some examples, GPU 10 may include a three-dimensional (3D) graphics rendering pipeline (not shown). In such examples, raster operations unit 34 may form a part of the 3D graphics rendering pipeline.

In some examples, GPU 10 may include a plurality of processing units (not shown), each of which may be a programmable processing unit or a fixed-function processing unit. In cases where GPU 10 includes a 3D graphics rendering pipeline, the plurality of processing units may operate together to implement the 3D graphics rendering pipeline. In some examples, the 3D graphics rendering pipeline may conform to a 3D graphics pipeline that is specified by one or more public and/or proprietary 3D graphics standard APIs, such as, e.g., an Open Graphics Library (OpenGL®) API, an Open Graphics Library Embedded Systems (OpenGL ES) API, a Direct3D API, a DirectX API, etc.

A programmable processing unit may include, for example, a programmable shader unit that is configured to execute one or more shader programs that are loaded onto GPU 10 by CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units may include, for example, vertex shader units, pixel shader units, geometry shader units, hull shader units, domain shader units, compute shader units, etc.

A fixed-function processing unit may include hardware that is hard-wired to perform certain functions. Although the fixed function hardware may be configurable, via one or more control signals for example, to perform different functions, the fixed function hardware typically does not include a program memory that is capable of receiving user-compiled programs. The fixed function processing units included in GPU 10 may include, for example, processing units that perform, e.g., raster operations, depth testing, scissors testing, alpha blending, etc.

In examples where raster operations unit 34 is included in a 3D rendering pipeline, raster operations unit 34 may, in some examples, be a configurable, fixed-function processing unit. In some examples, raster operations unit 34 may be implemented as an output merger processing unit of a 3D rendering pipeline.

Command engine 32 is configured to receive commands from CPU 6 and to cause GPU 10 to execute the commands. In some examples, CPU 6 may place the commands in memory 22, and command engine 32 may retrieve the commands from memory 22. The commands may include, for example, state commands that change the state (e.g., rendering state) of GPU 10, shader program binding commands that instruct GPU 10 to load particular shader programs into one or more of the programmable processing units in a 3D rendering pipeline, drawing commands that instruct GPU 10 to render particular data stored in memory 22, general-purpose computing commands that instruct GPU 10 to execute one or more general-purpose computing kernels with respect to particular data stored in memory 22, and/or BLT commands that instruct GPU 10 to perform one or more BLT operations.

In response to receiving a state command, command engine 32 may be configured to set one or more state registers in GPU 10 to particular values based on the state command, and/or to configure one or more of the fixed-function processing units in a 3D rendering pipeline (not shown) for GPU 10 based on the state command. In response to receiving a draw call command, command engine 32 may be configured to cause the 3D rendering pipeline (not shown) in GPU 10 to retrieve 3D geometry from memory 22, and render the 3D geometry data into a 2D graphics image. In response to receiving a shader program binding command, command engine 32 may load one or more particular shader programs into one or more of the programmable processing units in the 3D rendering pipeline.

In response to receiving a BLT command, command engine 32 may cause GPU 10 to perform a BLT operation that corresponds to the BLT command. To perform the BLT operation, command engine 32 may, in some examples, configure one or more of raster operations unit 34, buffer 36, read engine 38 and write engine 40 based on the BLT command, and cause the configured components to perform a BLT operation that corresponds to the BLT command.

Raster operations unit 34 may perform one or more raster operations based on source data to generate destination data. The source data may correspond to one or more source BLT regions of a BLT operation. In some examples, raster operations unit 34 may receive the source data from buffer 36 and/or from write engine 40. The destination data may be written to a destination BLT region associated with the BLT operation.

The type of raster operation performed by raster operations unit 34 may be configurable, e.g. by command engine 32. The raster operation types may specify how the destination data is to be generated based on the source data for a particular BLT operation. In cases where raster operations unit 34 combines two different source regions to generate destination data (e.g., a compositing operation), the rasterization operation type may specify how the two different source regions are to be combined to generate the destination data. In some examples, the raster operation types may be bitwise operations that specify how destination data for a particular pixel location in a destination region is to be generated based on corresponding pixel locations in the source regions. The corresponding pixel locations in the source regions may be pixel locations that are in the same relative location of their respective source regions as the pixel location is in the destination region. The bitwise operations may include, for example, Boolean operations, such as bitwise AND, OR, NOT and/or XOR operations. The bitwise operations may also include bit copy operations, bit inverting operations, solid fill operations, etc.

In additional examples, the raster operation types may include blending operations (e.g., alpha blending operations). In some examples, a blending operation may specify a source pixel multiplier and a destination pixel multiplier to be used during execution of the blending operation. In such examples, during execution of the blending operation, a source pixel value (e.g., a source pixel color and/or a source alpha value) may be multiplied by the source pixel multiplier to produce a first product, a corresponding destination pixel value (e.g., a destination pixel color and/or a destination alpha value) may be multiplied by the destination pixel multiplier to produce a second product, and the sum of the two products may be added together to produce a destination value for the pixel location. Other types of blending operations are also possible.

In some examples, command engine 32 may configure raster operations unit 34 based on data included in a BLT command received by GPU 10 from CPU 6. For example, command engine 32 may select a type of raster operation to be performed by raster operations unit 34 based on a type of raster operation that is specified in the BLT command, and configure raster operations unit 34 to perform the BLT operation using the selected type of rasterization operation.

Although raster operations unit 34 has been described herein as combining different source regions to produce destination data for a BLT operation, in other examples, one or more other components in GPU 10 may be used in addition to or lieu of raster operations unit 34 to perform the BLT operation. For example, a shader program executing on a shader unit (not shown) of GPU 10 may combine the different source regions according to a combination technique that is specified in the shader program to generate destination data for a BLT operation.

Buffer 36 may store source data that is retrieved from memory 22 during the execution of a BLT operation. In some examples, buffer 36 may be implemented as a plurality of registers within GPU 10. Buffer 36 may utilize any of a variety of buffering schemes including, for example, a first-in-first-out (FIFO) buffering scheme. According to the FIFO buffering scheme, source data that is stored in buffer 36 is consumed by a consumer (e.g., write engine 40) in the order in which the source data was placed into buffer 36.

Read engine 38 may be configured to issue read requests to memory subsystem 8 and to place source data received in response to the read requests into buffer 36. The read requests may collectively read data from one or more source BLT regions specified in a BLT command received from CPU 6.

Write engine 40 may be configured to consume source data from buffer 36, generate destination data based on the consumed source data, and issue write requests to memory subsystem 8 in order to write destination data to a destination region in memory 22. The write requests may collectively write data to a destination BLT region specified in a BLT command received from CPU 6.

In some examples, write engine 40 may generate the destination data such that the destination data is identical to the source data. Such examples may be used to perform, for example, BLT copy operations. In further examples, write engine 40 may combine source data from at least two different source regions to generate the destination data. Such examples may be used to perform, for example, BLT compositing operations. In such examples, write engine 40 may, in some examples, use raster operations unit 34 to perform a raster operation in order to combine the source data and generate the destination data.

In some examples, consuming the source data may refer to write engine 40 receiving the source data directly from read engine 38 and processing the source data. In further examples, consuming the source data may refer to write engine 40 retrieving the source data from buffer 36 and processing the source data. Processing the source data may include generating destination data based on the source data. After the data has been processed, write engine 40 may issue a write request to write the destination data.

In some examples, read engine 38 may require the beginning of each line of a surface that is read to correspond to a memory address that is an integer multiple of a predetermined alignment width. Such a requirement may be an example of an alignment constraint as described in this disclosure, and the predetermined alignment width may be an alignment parameter for the alignment constraint. Such an alignment constraint may simplify the hardware for implementing read engine 38. A memory address that is an integer multiple of the predetermined alignment width may be referred to as an alignment boundary. When read engine 38 requires such an alignment constraint for proper operation, read engine 38 may be referred to as an alignment-constrained read engine 38.

Similarly, write engine 40 may, in further examples, require the beginning of each line of a surface to be written to correspond to an integer multiple of a predetermined alignment width. Such a requirement may an example of an alignment constraint as described in this disclosure, and the predetermined alignment width may be an alignment parameter for the alignment constraint. Such a requirement may simplify the hardware for implementing write engine 40. When write engine 40 requires such an alignment constraint for proper operation, write engine 40 may be referred to as an alignment-constrained write engine 40.

In some examples, both read engine 38 and write engine 40 may be alignment-constrained. In further examples, read engine 38 may be alignment-constrained, and write engine 40 may not be alignment constrained. In additional examples, write engine 40 may be alignment-constrained, and read engine 38 may not be alignment constrained. In another example, neither read engine 38 nor write engine 40 may be alignment-constrained.

Memory subsystem 8 includes memory 22. Memory 22 may store one or more source surfaces 42 and a destination surface 44. Each of source surfaces 42 and destination surface 44 correspond to a two-dimensional array of pixel data. The pixel data may include red, green, blue (RGB) color values and, in some cases, an alpha value (A) for each pixel location in the surface. Because source surfaces 42 and destination surface 44 correspond to a two-dimensional array of pixel data, the pixel data for an individual pixel location in the surface may be addressed by row and column coordinates. Each of the source regions used in a BLT operation may correspond to all or a subset of a respective source surface, and the destination region may correspond to all or a subset of the destination surface. The source and destination regions may be the same size and shape, and are typically, but not necessarily, rectangular-shaped regions. Although FIG. 2 depicts separate source surfaces 42 and a destination surface 44. In some examples, destination surface 44 may be used as a source surface for a BLT operation and/or one or more of source surfaces 42 may serve as a destination surface for a BLT operation. Memory subsystem 8 is communicatively coupled to CPU 6, GPU 10, read engine 38 and write engine 40 via bus 16.

In response to receiving memory access requests, memory subsystem 8 may cause the requested memory operation to be performed with respect to memory 22. For example, in response to receiving a read request, memory subsystem 8 may obtain (i.e. read) data stored in memory 22 from one or more memory locations in memory 22 that correspond to the one or more memory addresses specified in the read request, and provide the obtained data to GPU 10 (e.g., read engine 38). As another example, in response to receiving a write request and write data that corresponds to the write request, memory subsystem 8 may cause the write data to be stored in memory 22 at one or more locations that correspond to the one or more memory addresses specified in the write request. In some examples, memory subsystem 8 may provide confirmation to write engine 40 that the write request was successfully completed.

Although command engine 32 is described herein as configuring the other processing components in GPU 10 to perform the BLT operation, in other examples, one or more other components in GPU 10 may perform these functions in addition to or in lieu of command engine 32. For example, a dedicated BLT operation control unit may be used to perform the above-mentioned functionality of command engine 32, or read engine 38 and write engine 40 may be configured to perform such functionality.

As discussed above, GPU 10 may perform BLT operations to service BLT commands received from CPU 6. BLT operations may include BLT copy operations and BLT compositing operations. In some examples, the BLT operations may be alternatively referred to as memory transfer operations. BLT copy operations may involve copying data from a source region of a source surface to a destination region of a destination surface. That is, GPU 10 may read data from a source region of a source surface and write an exact replica of the data contained in the source region of the source surface to a destination region of a destination surface.

BLT compositing operations may involve combining at least two different source regions of the same or different source surfaces in some fashion, and writing the combination of the source regions to a destination region of a destination surface. In some cases, one or more of the source surfaces may be the same surface as the destination surface for a BLT compositing operation. For example, a BLT compositing operation may involve reading a single source region and a single destination region, blending the two together, and writing the blended result back to the destination region.

In some examples, when performing a BLT compositing operation, the different source regions may be combined according to a raster operation, which may be different for different instances of the BLT compositing operation. The raster operation may be an operation that specifies how the bits are to be combined for a particular BLT compositing operation. In some examples, the raster operations may include bitwise operations, such as, e.g., Boolean logic operations. The Boolean logic operations may include, e.g., bitwise AND, OR, NOT and/or XOR operations. In additional examples, the raster operations may include blending operations (e.g., alpha blending operations).

The source and destination surfaces used in a BLT operation may be the same or different surfaces, and may each correspond to a two-dimensional array of pixel data. The pixel data may include red, green, blue (RGB) color values and, in some cases, an alpha value (A) for each pixel in the surface. Because the surfaces correspond to a two-dimensional array of pixel data, the pixel data for an individual pixel location in the surface may be addressed by row and column coordinates. Each of the source regions used in a BLT operation may correspond to all or a subset of a respective source surface. Similarly, the destination region used in a BLT operation may correspond to all or a subset of the destination surface. The source and destination regions may be the same size and shape, and are typically, but not necessarily, rectangular-shaped regions.

When GPU 10 performs a BLT operation, the source surfaces and the destination surfaces used for the BLT operation are typically stored in an off-chip memory 22. In other words, memory 22 may be formed on, located on, and/or disposed on a microchip, an integrated circuit, and/or a die that is different than the microchip, integrated circuit, and/or die upon which GPU 10 is formed, located, and/or disposed. Memory 22 may be communicatively coupled to GPU 10 via one or more buses and, in some cases, a memory controller.

When performing a BLT copy operation, GPU 10 may read data from each of the pixel locations in a source region and write the data that was read from the source region to corresponding pixel locations in the destination region. Similarly, when performing a BLT compositing operation, GPU 10 may read data from each of the locations in multiple source regions, combine the data, and write the combined data to the destination region.

Figure 3:
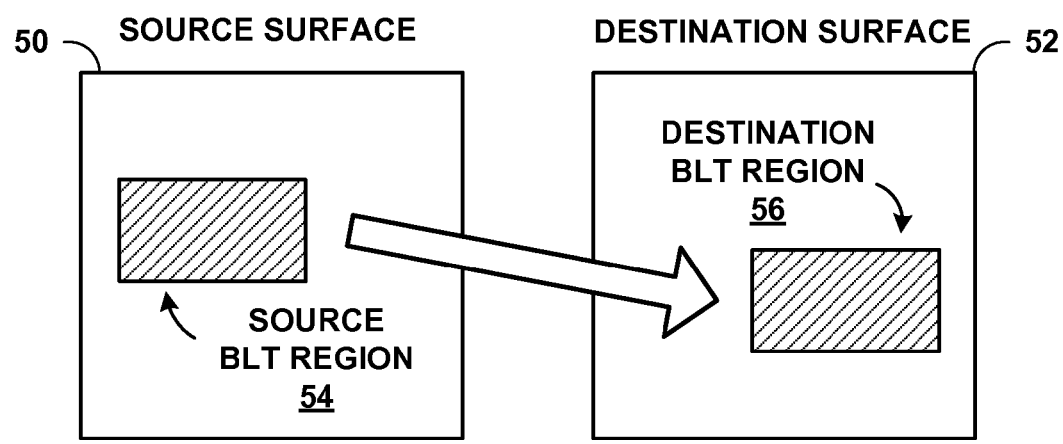
FIG. 3 is a conceptual diagram illustrating an example single source BLT operation according to this disclosure.

FIG. 3 is a conceptual diagram illustrating an example single source BLT operation according to this disclosure. FIG. 3 depicts a source surface 50 and a destination surface 52, each of which corresponds to a two-dimensional array of pixel data. The pixel data may include red, green, blue (RGB) color values and, in some cases, an alpha value (A) for each pixel in the surface. Because each of surfaces 50, 52 correspond to a two-dimensional array of pixel data, the pixel data for an individual pixel location in the surface may be indexed by row and column coordinates. In some examples, source surface 50 and destination surface 52 may be bitmaps. In further examples, source surface 50 and destination surface 52 may be a buffer resource, such as, e.g., a texture buffer. The example source surface 50 and destination surface 52 in FIG. 3 are the same shape and size, and are rectangular-shaped. However, in other examples, source surface 50 and destination surface 52 may have different shapes and/or sizes.

Source surface 50 includes a source BLT region 54, and destination surface 52 includes a destination BLT region 56. Source BLT region 54 includes a subset of the pixel data included in source surface 50, and destination BLT region 56 includes a subset of the pixel data included in destination surface 52. A subset of the pixel data included in a surface may refer to all or less than all of the pixel data included in the surface. As shown in FIG. 3, source BLT region 54 and destination BLT region 56 are the same size and shape, and are rectangular shaped. In other examples, however, source BLT region 54 and destination BLT region 56 may not be rectangular-shaped.

In the example BLT operation shown in FIG. 3, GPU 10 transfer data from source BLT region 54 of source surface 50 to destination BLT region 56 of destination surface 52. In general, the data for each pixel location in source BLT region 54 is transferred to the corresponding pixel location in destination BLT region 56. Different pixel locations in different regions may be said to be corresponding pixel locations if the relative position of each of the pixel locations in its respective region is the same. For instance, the third column of the second row in of source BLT region 54 and destination BLT region 56 have the same relative location.

The BLT operation shown in FIG. 3 is a single source BLT operation because a single source region is used as a source operand for the BLT operation. The single source BLT operation shown in FIG. 3 may represent a BLT copy operation where the data of source BLT region 54 is copied into destination BLT region 56. Although the BLT operation shown in FIG. 3 shows a separate source surface 50 and destination surface 52, in other examples, source surface 50 and destination surface 52 may be same surface. In such examples, source BLT region 54 and destination BLT region 56 may, in some examples, be different regions within the same surface between which data is transferred by the BLT copy operation.

Figure 4:
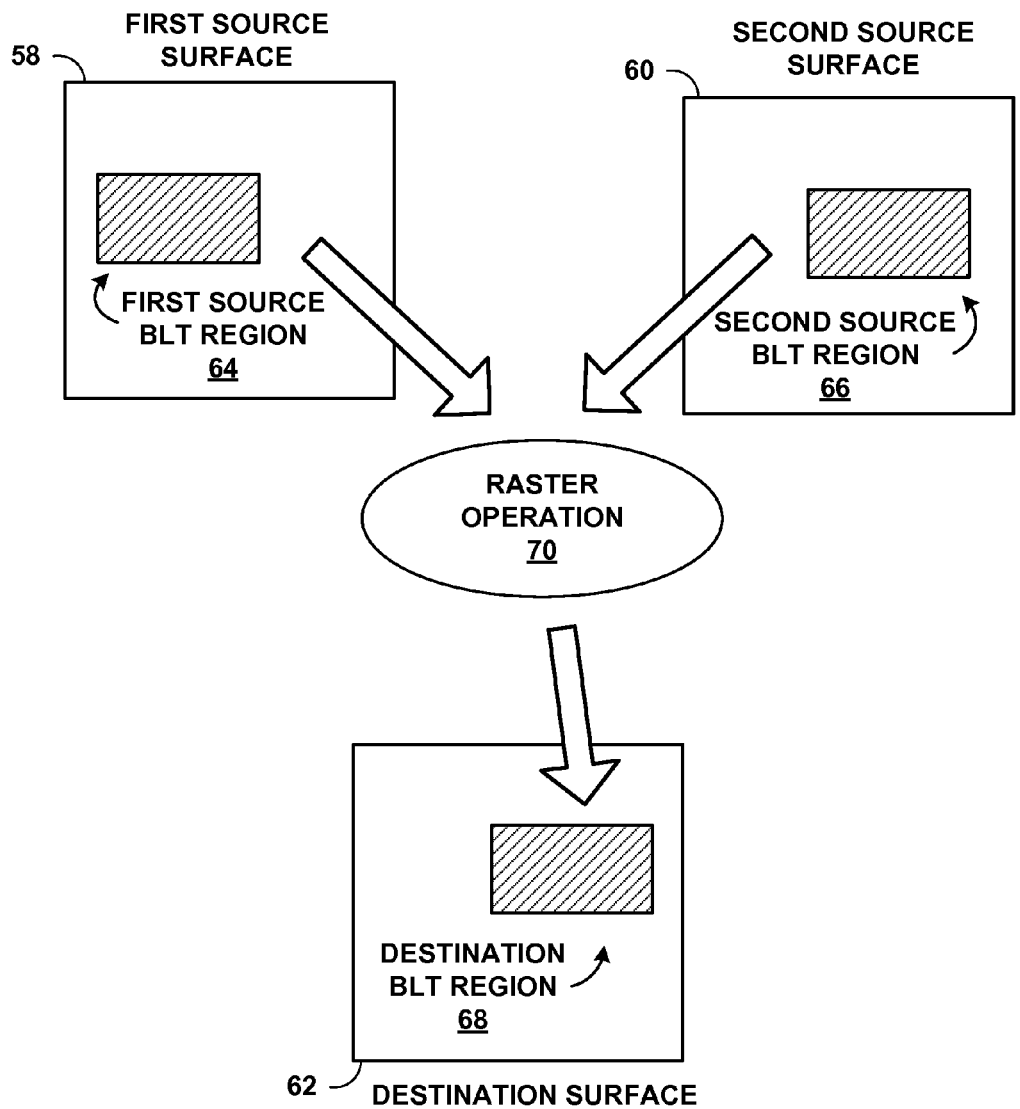
FIG. 4 is a conceptual diagram illustrating an example multiple source BLT operation according to this disclosure.

FIG. 4 is a conceptual diagram illustrating an example multiple source BLT operation according to this disclosure. FIG. 4 depicts a first source surface 58, a second source surface 60, and a destination surface 62. Each of surfaces 58, 60, 62 may be substantially similar to surfaces 50, 52 discussed above with respect to FIG. 3. First source surface 58 includes a first source BLT region 64, second source surface 60 includes a second source BLT region 66, and destination surface 62 includes a destination BLT region 68. First source BLT region 64 includes a subset of the pixel data included in first source surface 58, second source BLT region 66 includes a subset of the pixel data included in second source surface 60, and destination BLT region 68 includes a subset of the pixel data included in destination surface 62. As shown in FIG. 4, first source BLT region 64, second source BLT region 66, and destination BLT region 68 are the same size and shape, and are rectangular shaped. In other examples, however, regions 64, 66 and 68 may not be rectangular-shaped.

In the example BLT operation of FIG. 4, source data from first source BLT region 64 and source data from second source BLT region 66 are combined via a raster operation 70 to generate destination data, and the destination data is placed into destination BLT region 68 of destination surface 62. In general, the data for each pixel location in first source BLT region 64 is combined with data from the corresponding pixel location in second source BLT region 66, and written to a corresponding pixel location in destination BLT region 68. Different pixel locations in different regions may be said to be corresponding pixel locations if the relative position of each of the pixel locations in its respective region is the same.

The BLT operation shown in FIG. 4 is a multiple source BLT operation because multiple source regions are used as source operands for the BLT operation. The multiple source BLT operation shown in FIG. 4 may represent a BLT compositing operation where GPU 10 combines or composites data from two different source regions to generate destination data that is written to a destination region. Although the BLT operation shown in FIG. 4 shows a separate first source surface 58, second source surface 60 and destination surface 62, in other examples, one or more of surfaces 58, 60, 62 may be same surface. For example, second source surface 60 and destination surface 62 may be the same surface, and second source BLT region 66 and destination BLT region 68 may be same regions within that surface. In such an example, the BLT compositing operation may merge pixel data in first source BLT region 64 with existing pixel data in destination surface 62 using a particular raster operator.

Figure 5:
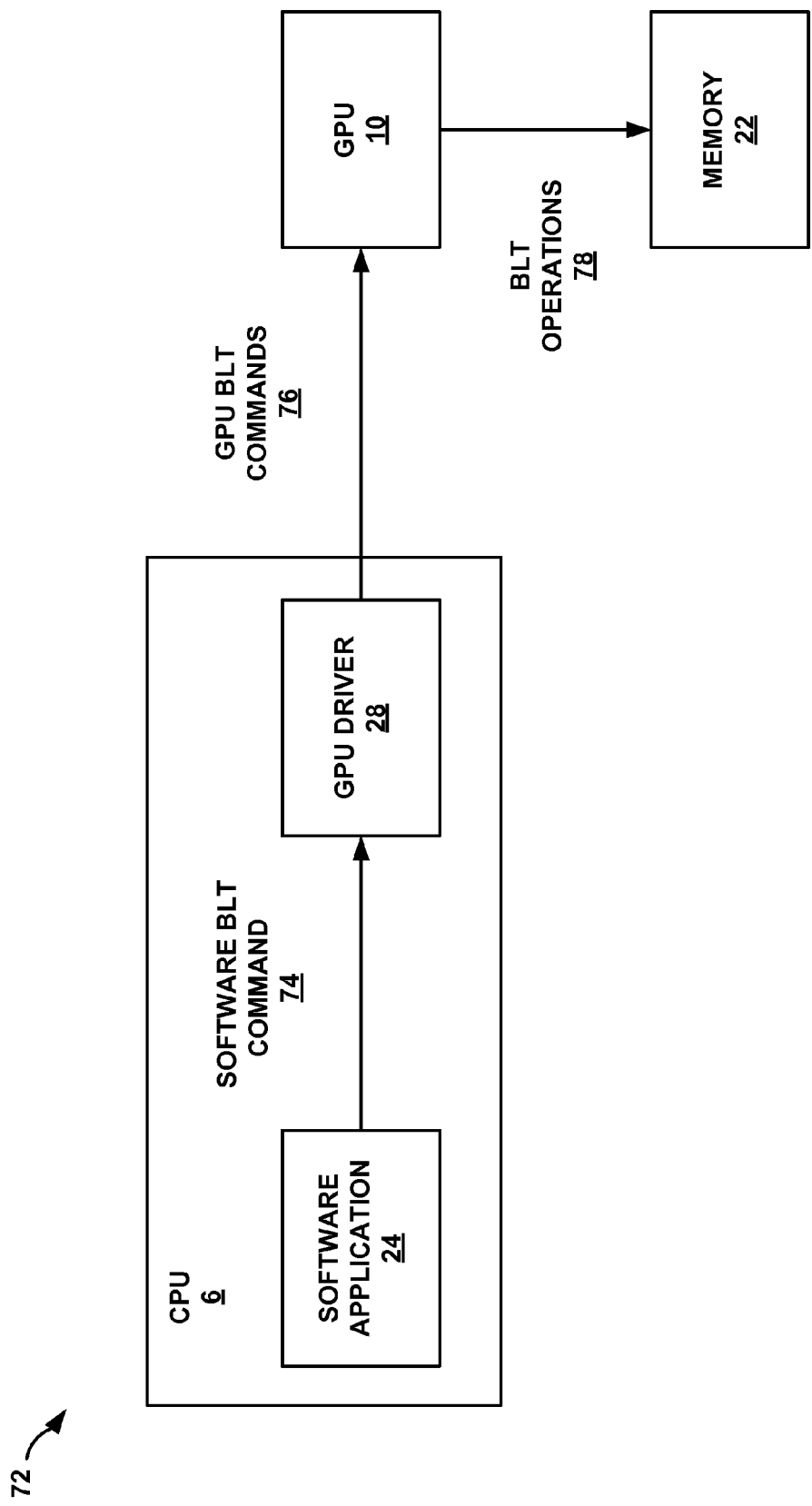
FIG. 5 is a conceptual diagram illustrating an example command processing flow for the example computing device of FIGS. 1 and 2.

FIG. 5 is a conceptual diagram illustrating an example command processing flow 72 for the example computing device 2 of FIGS. 1 and 2. As shown in FIG. 5, software application 24 issues a software BLT command 74 to GPU driver 28. GPU driver 28 receives software BLT command 74, generates one or more GPU BLT commands 76 based on software BLT command 74, and issues GPU BLT commands 76 to GPU 10. GPU 10 performs BLT operations 78 to service the GPU BLT commands 76. For example, for each of the GPU BLT commands 76, GPU 10 may perform a respective aligned BLT operation 78.

In some examples, software BLT command 74 may be an unaligned BLT command, and GPU BLT commands 76 may include multiple aligned BLT commands that correspond to software BLT command 74. In such examples, GPU driver 28 may convert the unaligned software BLT command 74 into multiple aligned GPU BLT commands 76 according to any of the techniques described in this disclosure.

Figure 6:
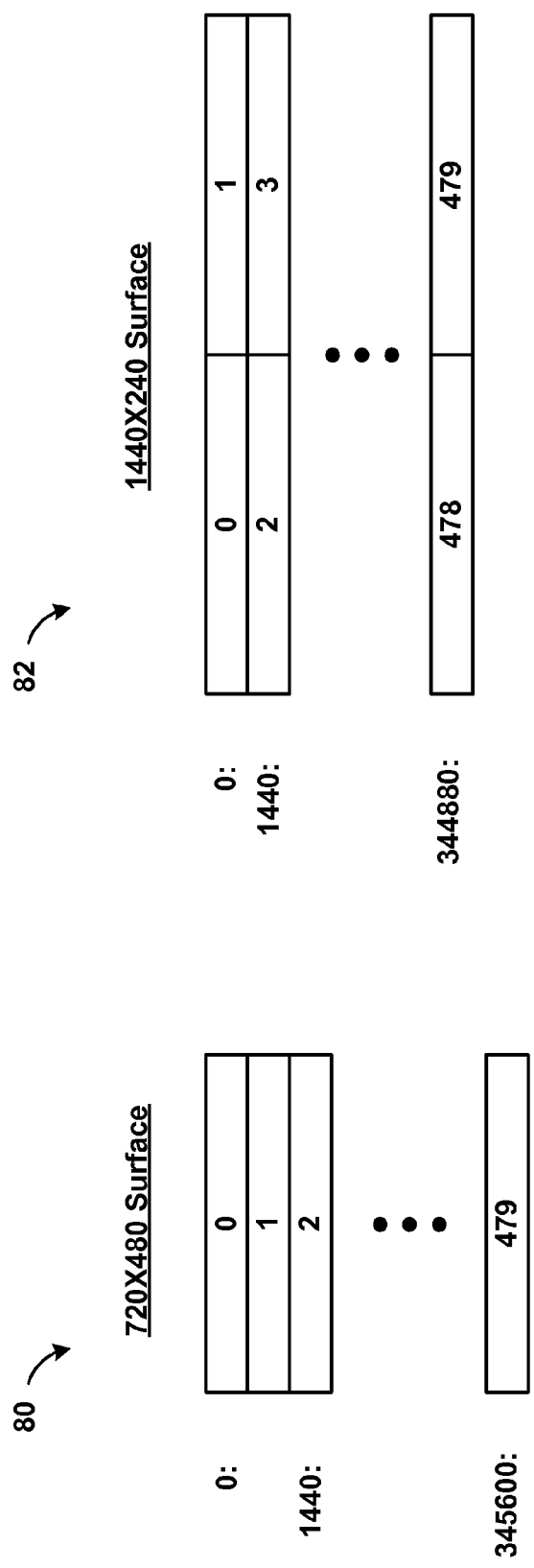
FIG. 6 is a conceptual diagram illustrating an example technique for generating aligned surfaces by combining lines of a surface according to this disclosure.

FIG. 6 is a conceptual diagram illustrating an example technique for defining an aligned virtual surface according to this disclosure. FIG. 6 illustrates an unaligned surface 80 and a virtual surface 82. Unaligned surface 80 may be received from software application 24 as part of an unaligned BLT command. GPU driver 28 may define virtual surface 82 based on unaligned surface 80.

In the example of FIG. 6, a 32 byte alignment-constrained GPU (e.g., GPU 10) is used to perform the BLT operations. A 32 byte alignment-constrained GPU may correspond to a GPU that requires the beginning of each of the lines of a surface to be an integer multiple of 32 (i.e., the predetermined alignment width). Each multiple of 32 (i.e., the alignment width) may be referred to as an alignment boundary.

As shown in FIG. 6, the surface width for unaligned surface 80 is 720 bytes, and the surface height for unaligned surface 80 is 480 lines. Because 720 is not divisible by 32, some lines of unaligned surface 80 will not begin at a memory address that is a multiple of 32. Therefore, surface 80 is said to be unaligned.

GPU driver 28 may define virtual surface 82 by combining sets of two lines from unaligned surface 80 together to form single lines in virtual surface 82. As shown in FIG. 6, virtual surface 82 is twice as wide and half as high as unaligned surface 80. The surface width of virtual surface 82 is 1440 bytes, which is divisible by 32. Therefore, virtual surface 82 is an aligned surface upon which a 32 byte alignment-constrained GPU may perform BLT operations.

Figure 7:
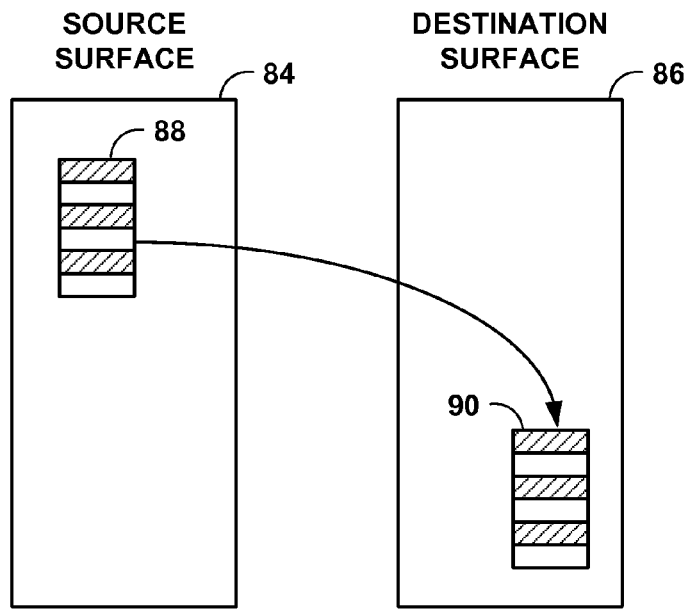
FIGS. 7 and 8 are conceptual diagrams illustrating an example conversion of an unaligned BLT operation into two aligned BLT operations using the technique illustrated in FIG. 6.
Figure 8:
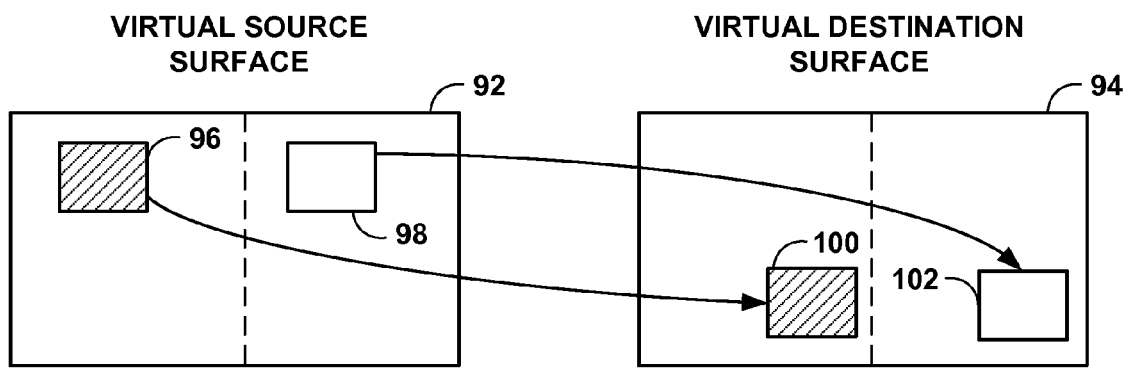

FIGS. 7 and 8 are conceptual diagrams illustrating an example conversion of an unaligned BLT operation into two aligned BLT operations using aligned virtual surfaces defined according to the technique illustrated in FIG. 6.

FIG. 7 illustrates a single unaligned BLT operation that may be associated with a BLT command received from software application 24. The unaligned BLT command specifies an unaligned source surface 84 and an unaligned destination surface 86 for the BLT operation. Source surface 84 includes source BLT region 88, and destination surface 86 includes destination BLT region 90. As shown in FIG. 7, the unaligned BLT operation transfers source BLT region 88 of source surface 84 to destination BLT region 90 of destination surface 86.

FIG. 8 illustrates an aligned two-BLT operation that corresponds to the single unaligned BLT operation. The aligned two-BLT operation may include two separate BLT operations that are specified by two aligned BLT commands. Each of the aligned BLT commands may specify an aligned virtual source surface 92 and an aligned virtual destination surface 94 for the BLT operation. Virtual source surface 92 includes source BLT regions 96, 98, and virtual destination surface 94 includes destination BLT regions 100, 102.

Virtual source surface 92 may be defined based on source surface 84, and virtual destination surface 94 may be defined based on destination surface 86. GPU driver 28 may use the technique illustrated in FIG. 6 to transform source surface 84 into virtual source surface 92, and to transform destination surface 86 into virtual destination surface 94.

For example, GPU driver 28 may combine every set of two lines together in source surface 84 to form a single line in virtual source surface 92. This effectively causes all of the even lines of source surface 84 to be aggregated on the left-hand side of virtual source surface 92, and all of the odd lines of source surface 84 to be aggregated on the right-hand side of virtual source surface 92. GPU driver 28 may use a similar technique to combine the lines of destination surface 86 together to form virtual destination surface 94.

In FIG. 7, every other line of regions 88, 90 is hatched in an alternating fashion. As shown in FIG. 8, combining the lines of source surface 84 to form virtual source surface 92 causes source BLT region 88 to be transformed such that it no longer is one contiguous, rectangular region. Instead, source BLT region 88 is transformed into source BLT region 96 and 98, where source BLT region 96 represents the even lines of source BLT region 88 and source BLT region 98 represents the odd lines of source BLT region 88. As such, source BLT region 88 has been transformed into two separate rectangular regions that are not contiguous with each other. A similar transformation takes place with respect to destination BLT region 90, where destination BLT region 90 is transformed into destination BLT regions 100 and 102.

In this example, a single BLT operation cannot be performed for a non-contiguous BLT region. Because there are now two separate source BLT regions 96, 98 and two separate destination BLT regions 100, 102, GPU driver 28 converts the single unaligned BLT command for unaligned surfaces 84, 86 into two aligned BLT commands performed with respect to virtual surfaces 92 and 94—one BLT command for the hatched regions 96, 100 and one BLT command for the white regions 98, 102. In this way, GPU driver 28 may cause GPU 10 to perform two BLT operations, where a first BLT operation transfers source BLT region 96 to destination BLT region 100, and a second BLT operation transfers source BLT region 98 to destination BLT region 102.

The multiple BLT commands generated by GPU driver 28 may collectively process the entire source BLT region 88 and destination BLT region 90, thereby producing the same resulting memory state as that which would have been produced by the single, unaligned BLT command. Moreover, each of the aligned BLT commands is performed with respect to a 32 byte aligned virtual surface (i.e., virtual surfaces 92 and 94), which allows the BLT commands to be processed by a 32 byte alignment-constrained GPU. In this way, GPU driver 28 may convert an unaligned BLT command into multiple aligned BLT commands that can be serviced by an alignment-constrained GPU, and thereby obtain the benefits of relatively low-power GPU-accelerated BLT processing.

In some examples, to convert the unaligned BLT command into multiple aligned BLT commands, GPU driver 28 may convert the coordinates and dimensions of a BLT source or destination region associated with the unaligned BLT command into coordinates and dimensions for BLT regions to be used for the multiple aligned BLT commands. In some examples, for the two-BLT conversion operation shown in FIGS. 7 and 8, GPU driver 28 may generate the BLT region coordinates and dimensions based on the following pseudo-code:

SRC_width corresponds to the surface width of source surface 84 (e.g., in bytes), DST_width corresponds to the surface width of destination surface 86 (e.g., in bytes), SRC_SURFACE_base corresponds to the surface pointer of source surface 84, SRC_SURFACE_WIDTH corresponds to the surface width of source surface 84, SRC_SURFACE_HEIGHT corresponds to the height of source surface 84, DST_SURFACE_base corresponds to the surface pointer of destination surface 86, DST_SURFACE_WIDTH corresponds to the surface width of destination surface 86, DST_SURFACE_HEIGHT corresponds to the height of destination surface 86, New_SRC_X corresponds to the x-coordinate of the upper left-hand corner of source BLT region 96 (for BLT1) or source BLT region 98 (for BLT2), New_SRC_Y corresponds to the y-coordinate of the upper left-hand corner of source BLT region 96 (for BLT1) or source BLT region 98 (for BLT2), New DST_X corresponds to the x-coordinate of the upper left-hand corner of destination BLT region 100 (for BLT1) or destination BLT region 102 (for BLT2), New DST_Y corresponds to the y-coordinate of the upper left-hand corner of destination BLT region 100 (for BLT1) or destination BLT region 102 (for BLT2), New BLT_width corresponds to the width (e.g., in bytes) of source BLT region 96 (for BLT1) or source BLT region 98 (for BLT2), New BLT_Height corresponds to the height (e.g., in lines) of source BLT region 96 (for BLT1) or source BLT region 98 (for BLT2), New SRC_SURFACE_base corresponds to the surface pointer of virtual source surface 92, New SRC_SURFACE_WIDTH corresponds to the sur-

```
BLT1:   New_SRC_X = SRC_X + (SRC_Y & 0x1)* SRC_width;
        New_SRC_Y = SRC_Y/2;
        New DST_X = DST_X + (DST_Y & 0x1) * DST_width;
        New DST_Y = DST_Y/2;
        New BLT_width = BLT_width
        New BLT_height = (BLT_Height +1)/2;
        New SRC_SURFACE_base = SRC_SURFACE_base;   // Unchanged
        New SRC_SURFACE_WIDTH = SRC_SURFACE_WIDTH*2
        New SRC_SURFACE_HEIGHT = SRC_SURFACE_HEIGHT +
            ((~SRC_Y)&1)/2
        New DST_SURFACE_base = DST_SURFACE_base   // Unchanged
        New DST_SURFACE_WIDTH = DST_SURFACE_WIDTH*2
        New DST_SURFACE_HEIGHT = DST_SURFACE_HEIGHT+
            ((~SRC_Y)&1)/2
BLT2:   New_SRC_X = SRC_X + ((SRC_Y+1) & 0x1)* SRC_width;
        New_SRC_Y = (SRC_Y+1)/2;
        New DST_X = DST_X + ((DST_Y+1) & 0x1) * DST_width;
        New DST_Y = (DST_Y+1)/2;
        New BLT_width = BLT_width
        New BLT_height = (BLT_Height)/2;
        New SRC_SURFACE_base = SRC_SURFACE_base;   // Unchanged
        New SRC_SURFACE_WIDTH = SRC_SURFACE_WIDTH*2;
        New SRC_SURFACE_HEIGHT = (SRC_SURFACE_HEIGHT +
            ((~SRC_Y+1)&1)/2;
        New DST_SURFACE_base = DST_SURFACE_base;   // Unchanged
        New DST_SURFACE_WIDTH = DST_SURFACE_WIDTH*2;
        New DST_SURFACE_HEIGHT = (DST_SURFACE_HEIGHT+1) +
            ((~SRC_Y+1)&1)/2;
```

In the example pseudo-code, BLT1 and BLT2 correspond to different aligned BLT commands that are generated based on a single unaligned BLT command, SRC_X corresponds to the x-coordinate of the upper left-hand corner of source BLT region 88, SRC_Y corresponds to the y-coordinate of the upper left-hand corner of source BLT region 88, DST_X corresponds to the x-coordinate of the upper left-hand corner of destination BLT region 90, DST_Y corresponds to the y-coordinate of the upper left-hand corner of destination BLT region 90, BLT_width corresponds to the width of source BLT region 88 (e.g., in bytes), BLT_Height corresponds to the height of source BLT region 88 (e.g., in lines), face width of virtual source surface 92, New SRC_SURFACE_HEIGHT corresponds to the height of virtual source surface 92, New DST_SURFACE_base corresponds to the surface pointer of virtual destination surface 94, New DST_SURFACE_WIDTH corresponds to the surface width of virtual destination surface 94, and New DST_SURFACE_HEIGHT corresponds to the height of virtual destination surface 94.

In the example, pseudo-code, the operator "/" corresponds to integer division, the operator "&" corresponds to a bit-wise AND operation, and the prefix "Ox" indicates that the number that follows is a hexadecimal constant. In some examples, the value of New SRC_SURFACE_HEIGHT for virtual source surface 92 may be different for BLT1 and BLT2, resulting in slightly different virtual source surfaces being used for BLT1 and BLT2. In further examples, the value of New DST_SURFACE_HEIGHT for virtual destination surface 94 may be different for BLT1 and BLT2, resulting in slightly different virtual destination surfaces being used for BLT1 and BLT2.

Figure 9:
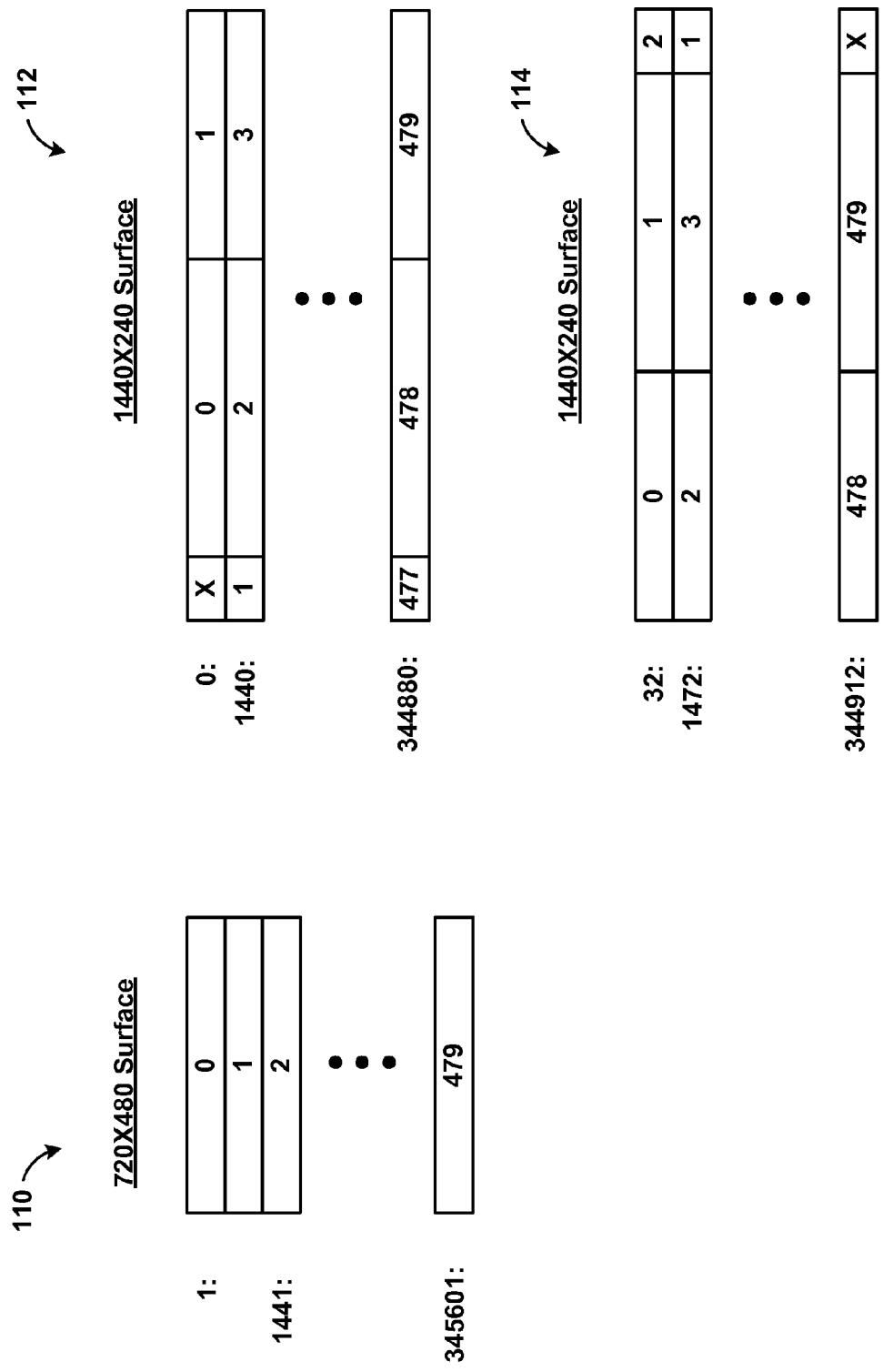
FIG. 9 is a conceptual diagram illustrating an example technique for defining multiple aligned virtual surfaces according to this disclosure.

FIG. 9 is a conceptual diagram illustrating an example technique for defining multiple aligned virtual surfaces according to this disclosure. FIG. 9 illustrates an unaligned surface 110 and two virtual surfaces 112, 114. Unaligned surface 110 may be received from software application 24 as part of an unaligned BLT command. Virtual surfaces 112, 114 may be defined by GPU driver 28 based on unaligned surface 110.

In the example of FIG. 9, a 32 byte alignment-constrained GPU is used to perform the BLT operations. As shown in FIG. 9, the surface width for unaligned surface 110 is 720 bytes, and the surface height for unaligned surface 110 is 480 lines. Because 720 is not divisible by 32, some lines for unaligned surface 110 will not begin at a memory address that is a multiple of 32. Therefore, surface 110 is said to be unaligned.

To deal with this issue, CPU 6 may widen the width of unaligned surface 110 in a manner similar to what was described above with respect to FIG. 6. This will cause the widened surface width to correspond to the alignment width constraint. However, unaligned surface 110 has a surface pointer of 1. Because 1 is not divisible by 32, the surface pointer of the widened surface is unaligned. As such, the widened surface is still not aligned.

One approach for dealing with this issue is to shift the surface pointer such that the shifted surface pointer points to the nearest alignment boundary. Similar to the technique described above with respect to FIGS. 6-8, widening the surface may transform the rectangular BLT region into multiple separate rectangular regions, and GPU driver 28 may generate multiple BLT commands, where each of the BLT commands causes the GPU to perform a BLT operation for a respective one of the rectangular BLT regions. However, if the width of the virtual surface remains the same, shifting the surface pointer may cause transformed rectangular BLT regions that are near the border of the virtual surface to wrap around the edges of the virtual surface. In other words, such transformed BLT rectangular regions may no longer be contiguous, and may not be able to be serviced by a single BLT operation.

To deal with this issue, GPU driver 28 may generate two virtual surfaces 112, 114 for each of the source and destination surfaces. Virtual surfaces 112, 114 may have the same widened surface width, but different aligned surface pointers. In some examples, GPU driver 28 may determine the two nearest alignment boundaries to the unaligned surface pointer of virtual surface 112, and assign one of the nearest alignment boundaries as the surface pointer for virtual surface 112 and the other of the nearest alignment boundaries as the surface pointer for virtual surface 114. For the example in FIG. 9, the nearest 32 byte alignment boundaries to the unaligned surface pointer of 1 are 0 and 32. Thus, GPU driver 28 sets the surface pointer of virtual surface 112 to 0, and sets the surface pointer of virtual surface 114 to 32.

The surface width of each of virtual surfaces 112, 114 is 1440 bytes, which is divisible by 32. In addition, each of the surface pointers for the virtual surfaces points to a memory address (i.e., 0 and 32), which is divisible by 32. Therefore, both of virtual surfaces 112, 114 are aligned surfaces upon which a 32 byte alignment-constrained GPU may perform BLT operations.

As shown in FIG. 9, each of the even lines of unaligned surface 110 is completely contained in a respective one of the lines of virtual surface 112. Similarly, each of the odd lines of unaligned surface 110 is completely contained in a respective one of the lines of virtual surface 114. As such, GPU driver 28 may cause GPU 10 to perform a first aligned BLT operation with respect to the even lines of unaligned surface 110 using virtual surface 112, and to perform a second aligned BLT operation with respect to the odd lines of unaligned surface 110 using virtual surface 114. Performing BLT operations in this manner may avoid the need to process transformed rectangular BLT regions that wrap around the edges of either of virtual surfaces 112, 114.

Figure 10:
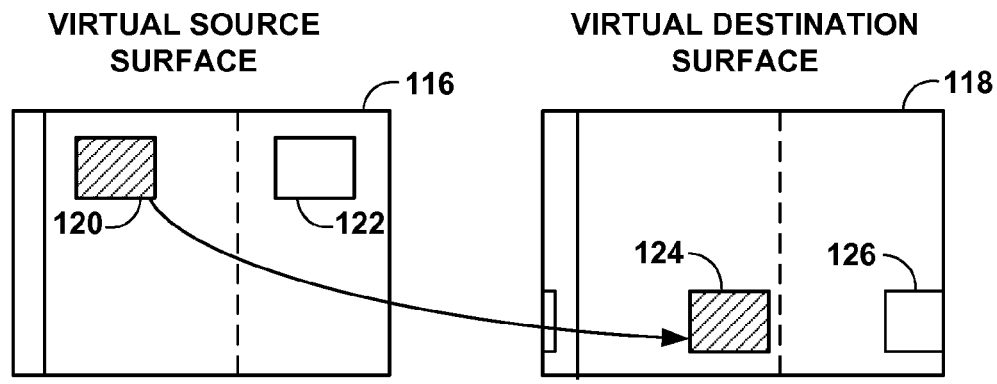
FIGS. 10 and 11 are conceptual diagram illustrating an example conversion of an unaligned BLT operation into two aligned BLT operations using the multiple aligned virtual surfaces defined in FIG. 9 according to this disclosure.
Figure 11:
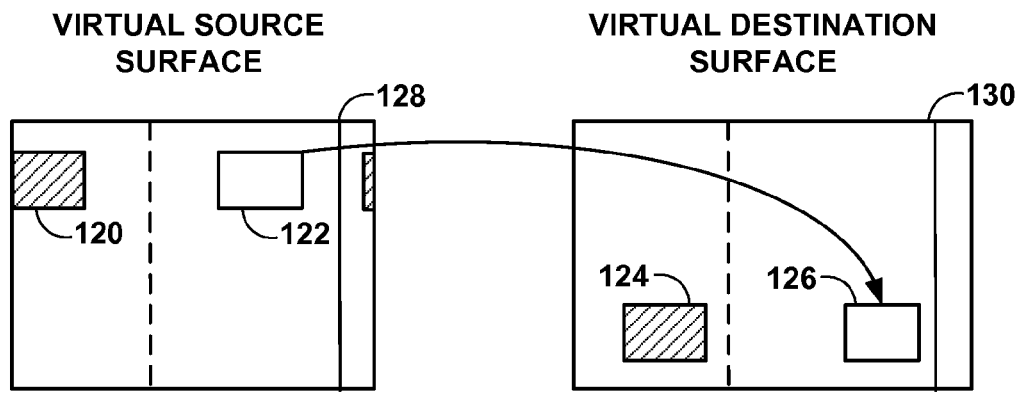

FIGS. 10 and 11 are conceptual diagram illustrating an example conversion of an unaligned BLT operation into two aligned BLT operations using the multiple aligned virtual surfaces defined in FIG. 9 according to this disclosure. Starting with the single unaligned BLT operation shown in FIG. 7, GPU driver 28 may convert the single BLT operation into an even BLT operation shown in FIG. 10, and an odd BLT operation shown in FIG. 11.

Virtual source surfaces 116, 128 may be defined based on source surface 84 in FIG. 7, and virtual destination surfaces 118, 130 may be defined based on destination surface 86 in FIG. 7. GPU driver 28 may use the techniques illustrated in FIG. 9 to transform source surface 84 into virtual source surfaces 116, 128, and to transform destination surface 86 into virtual destination surfaces 118, 130. Specifically, virtual surfaces 116, 118 may correspond to virtual surface 112 in FIG. 9, and virtual surfaces 128, 130 may correspond to virtual surface 114 in FIG. 9. Virtual source surfaces 116, 128 each include source BLT regions 120, 122, and virtual destination surfaces 118, 130 each include destination BLT regions 124, 126.

GPU driver 28 causes GPU 10 to perform an even BLT operation (FIG. 10) with respect to source BLT region 120 and destination BLT region 124. Specifically, the even BLT operation may transfer source BLT region 120 of virtual source surface 116 to destination BLT region 124 of virtual destination surface 118. Similarly, GPU driver 28 causes GPU 10 to perform the odd BLT operation (FIG. 11) with respect to source BLT region 122 and destination BLT region 126. Specifically, the odd BLT operation may transfer source BLT region 122 of virtual source surface 128 to destination BLT region 126 of virtual destination surface 130.

As shown in FIG. 10, destination BLT region 126 wraps around the edge of virtual destination surface 118. Similarly, in FIG. 11, source BLT region 120 wraps around the edge of virtual source surface 128. The wrapping around of these regions causes these regions to be non-contiguous, thereby preventing a single BLT operation from being able to process the region. By performing the even and odd BLT operations in the above-described manner, however, the processing of these wrapped-around regions may be avoided, thereby increasing the efficiency of the BLT operations.

To cause GPU 10 to perform the even and odd BLT operations, GPU driver 28 may convert the single unaligned BLT command for the unaligned surfaces 84, 86 of FIG. 7 into two aligned BLT commands—one even BLT command performed with respect to virtual surfaces 116, 118 and shaded regions 120, 124, and one odd BLT command performed with respect to virtual surfaces 128, 130 and white regions 122, 126.

The multiple BLT commands generated by GPU driver 28 may collectively process the entire source and destination regions, thereby producing the same resulting memory state as that which would have been produced by the single, unaligned BLT command. Moreover, each of the aligned BLT commands is performed with respect to 32 byte aligned virtual surfaces, which allows the BLT commands to be processed by a 32 byte alignment-constrained GPU. In this way, GPU driver 28 may convert an unaligned BLT command into multiple aligned BLT commands that can be serviced by an alignment-constrained GPU, and thereby obtain the benefits of relatively low-power GPU-accelerated BLT processing.

In some examples, to convert the unaligned BLT command into multiple aligned BLT commands, GPU driver 28 may convert the coordinates and dimensions of a BLT source or destination region associated with the unaligned BLT command into coordinates and dimensions for BLT regions to be used for the multiple aligned BLT commands. In some examples, for the two-BLT conversion operation shown in FIGS. 7, 10 and 11, GPU driver 28 may generate the BLT region coordinates and dimensions based on the following pseudo-code:

```
BLT1:   SRC_align = (SRC_Y & 0x1)?((SRC_base & 0x3f) – 64) :
        SRC_base & 0x3f;
        DST_align = (DST_Y & 0x1)?((DST_base & 0x3f) – 64) :
        DST_base & 0x3f;
        NEW_SRC_base = SRC_base – SRC_align;
        NEW_DST_base = DST_base – DST_align;
        New_SRC_X = SRC_X + SRC_align + (SRC_Y & 0x1)*
        SRC_width;
        New_SRC_Y = SRC_Y/2;
        New DST_X = DST_X + DST_align + (DST_Y & 0x1) *
        DST_width;
        New DST_Y = DST_Y/2;
        New BLT_width = BLT_width
        New BLT_height = (BLT_Height +1)/2;
        New SRC_SURFACE_WIDTH =
        SRC_SURFACE_WIDTH*2;
        New SRC_SURFACE_HEIGHT =
        SRC_SURFACE_HEIGHT + (~SRC_Y)&1)/2;
        New DST_SURFACE_WIDTH =
        DST_SURFACE_WIDTH*2;
        New DST_SURFACE_HEIGHT =
        DST_SURFACE_HEIGHT + (~SRC_Y)&1)/22;
BLT2:   SRC_align = ((SRC_Y+1& 0x1)?((SRC_base & 0x3f) –
        64) : SRC_base & 0x3f;
        DST_align = ((DST_Y+1) & 0x1)?((DST_base & 0x3f) –
        64) : DST_base & 0x3f;
        NEW_SRC_base = SRC_base – SRC_align;
        NEW_DST_base = DST_base – DST_align;
        New_SRC_X = SRC_X + SRC_align + ((SRC_Y+1) &
        0x1)* SRC_width;
        New_SRC_Y = (SRC_Y+1)/2;
        New DST_X = DST_X + DST_align + ((DST_Y+1) &
        0x1) * DST_width;
        New DST_Y = (DST_Y+1)/2;
        New BLT_width = BLT_width
        New BLT_height = (BLT_Height)/2;
        New SRC_SURFACE_WIDTH =
        SRC_SURFACE_WIDTH*2;
        New SRC_SURFACE_HEIGHT =
        (SRC_SURFACE_HEIGHT+1) +
            ((~SRC_Y+1)&1)/2;
        New DST_SURFACE_WIDTH =
        DST_SURFACE_WIDTH*2;
        New DST_SURFACE_HEIGHT =
        (DST_SURFACE_HEIGHT+1) +
            ((~SRC_Y+1)&1)/2;
```

In the example pseudo-code, BLT1 corresponds to the even BLT operation shown in FIG. 10, BLT2 correspond to the odd BLT operation shown in FIG. 11, SRC_X corresponds to the x-coordinate of the upper left-hand corner of source BLT region 88, SRC_Y corresponds to the y-coordinate of the upper left-hand corner of source BLT region 88, DST_X corresponds to the x-coordinate of the upper left-hand corner of destination BLT region 90, DST_Y corresponds to the y-coordinate of the upper left-hand corner of destination BLT region 90, BLT_width corresponds to the width of source BLT region 88 (e.g., in bytes), BLT_Height corresponds to the height of source BLT region 88 (e.g., in lines), SRC_width corresponds to the surface width of source surface 84 (e.g., in bytes), DST_width corresponds to the surface width of destination surface 86 (e.g., in bytes), SRC_base corresponds to the surface pointer of source surface 84, DST base corresponds to the surface pointer of destination surface 86, SRC_SURFACE_WIDTH corresponds to the surface width of source surface 84, SRC_SURFACE_HEIGHT corresponds to the height of source surface 84, DST_SURFACE_WIDTH corresponds to the surface width of destination surface 86, DST_SURFACE_HEIGHT corresponds to the height of destination surface 86, New_SRC_X corresponds to the x-coordinate of the upper left-hand corner of source BLT region 120 (for BLT1) or source BLT region 122 (for BLT2), New_SRC_Y corresponds to the y-coordinate of the upper left-hand corner of source BLT region 120 (for BLT1) or source BLT region 122 (for BLT2), New DST_X corresponds to the x-coordinate of the upper left-hand corner of destination BLT region 124 (for BLT1) or destination BLT region 126 (for BLT2), New DST_Y corresponds to the y-coordinate of the upper left-hand corner of destination BLT region 124 (for BLT1) or destination BLT region 126 (for BLT2), New BLT_width corresponds to the width (e.g., in bytes) of source BLT region 120 (for BLT1) or source BLT region 122 (for BLT2), New BLT_Height corresponds to the height (e.g., in lines) of source BLT region 120 (for BLT1) or source BLT region 122 (for BLT2), New SRC_base corresponds to the surface pointer of virtual source surface 116 (for BLT1) or virtual source surface 128 (for BLT2), New DST base corresponds to the surface pointer of virtual destination surface 118 (for BLT1) or virtual destination surface 130 (for BLT2), New SRC_SURFACE_WIDTH corresponds to the surface width of virtual source surface 116 (for BLT1) or virtual source surface 128 (for BLT2), New SRC_SURFACE_HEIGHT corresponds to the height of virtual source surface 116 (for BLT1) or virtual source surface 128 (for BLT2), New DST_SURFACE_WIDTH corresponds to the surface width of virtual destination surface 118 (for BLT1) or virtual destination surface 130 (for BLT2), and New DST_SURFACE_HEIGHT corresponds to the height of virtual destination surface 118 (for BLT1) or virtual destination surface 130 (for BLT2).

In the example pseudo-code, the operator "/" corresponds to integer division, the operator "&" corresponds to a bit-wise AND operation, the (A)?(B):(C) operator corresponds to a ternary operator (e.g., an if-then-else framework (specifically, if A then B else C)), and the prefix "0x" indicates that the number that follows is a hexadecimal constant. In some examples, New SRC_SURFACE_HEIGHT for virtual source surface 92 may be different for BLT1 and BLT2, resulting in slightly different virtual source surfaces being used for BLT1 and BLT2. In further examples, New DST_SURFACE_HEIGHT for virtual destination surface 94 may be different for BLT1 and BLT2, resulting in slightly different virtual destination surfaces being used for BLT1 and BLT2.

Figure 12:
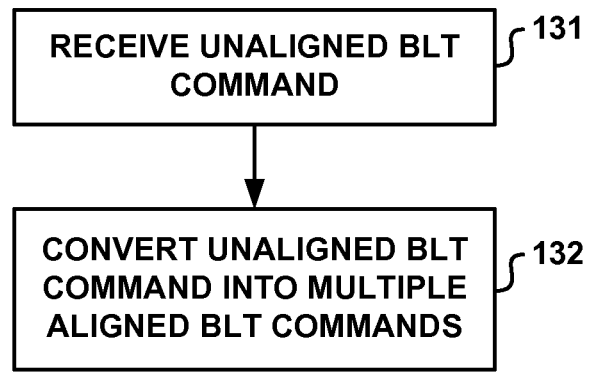
FIG. 12 is a flow diagram illustrating an example technique for processing unaligned BLT operations according to this disclosure.

FIG. 12 is a flow diagram illustrating an example technique for processing unaligned BLT operations according to this disclosure. CPU 6 receives an unaligned BLT command (131). CPU 6 (e.g., GPU driver 28) converts the unaligned BLT command into multiple aligned BLT commands (132).

In some examples, the unaligned BLT command specifies a first surface width for at least one of the surfaces associated with the unaligned BLT command. In such examples, to convert the unaligned BLT command, CPU 6 may determine a second surface width based on the first surface width, wherein the second surface width is N times the first surface width, and generate the multiple aligned BLT commands such that each of the multiple aligned BLT commands specifies the second surface width for at least one of the surfaces associated with each of the multiple aligned BLT commands. In such examples, N may be an integer greater than or equal to two. In some examples, N may equal two.

In further examples, to determining the second surface width CPU 6 may determine the second surface width based on the first surface width and a predetermined alignment width constraint associated with a processor that executes the multiple aligned BLT commands.

In additional examples, the first surface width may not be an integer multiple of the predetermined alignment width constraint. In such examples, to determine the second surface width based on the first surface width and the predetermined alignment width constraint, CPU 6 may determine the second surface width such that the second surface width is an integer multiple of the predetermined alignment width constraint.

In some examples, the multiple aligned BLT commands may include a first aligned BLT command and a second aligned BLT command, and the unaligned BLT command specifies a first BLT region. In such examples, to generate the multiple aligned BLT commands, CPU 6 may determine a second BLT region and a third BLT region based on the first BLT region, the second BLT region being different than the third BLT region, generate the first aligned BLT command such that the first aligned BLT command specifies the second BLT region, and generate the second aligned BLT command such that the second aligned BLT command specifies the third BLT region. In some cases, the second BLT region may include even lines of the first BLT region, and the third BLT region may include odd lines of the first BLT region.

In further examples, the unaligned BLT command specifies a first surface pointer value for a first surface associated with the unaligned BLT command. In such examples, in order to generate the multiple aligned BLT commands, CPU 6 may generate the multiple aligned BLT commands such that each of the multiple aligned BLT commands specifies the first surface pointer value for one of the surfaces associated with each of the multiple aligned BLT commands.

In additional examples, the multiple aligned BLT commands include a first aligned BLT command and a second aligned BLT command, and the unaligned BLT command specifies a first BLT region. In such examples, to generate the multiple aligned BLT commands, CPU 6 may determine a second BLT region and a third BLT region based on the first BLT region, the second BLT region being different than the third BLT region, and generate the first aligned BLT command such that the first aligned BLT command specifies the second surface width, the first surface pointer value, and the second BLT region. In such examples, CPU 6 may further generate the second aligned BLT command such that the second aligned BLT command specifies the second surface width, the first surface pointer value, and the third BLT region. In some cases, the second BLT region may include even lines of the first BLT region, and the third BLT region may include odd lines of the first BLT region.

In some examples, the unaligned BLT command specifies a first surface pointer value for a first surface associated with the unaligned BLT command, the first surface pointer value is not an integer multiple of a predetermined alignment width constraint associated with a processor that executes the multiple aligned BLT commands, and the multiple aligned BLT commands comprise a first aligned BLT command and a second aligned BLT command. In such examples, to generate the multiple aligned BLT commands, CPU 6 may determine a second surface pointer value and a third surface pointer value based on the first surface pointer value and the predetermined alignment width constraint such that the second and third surface pointer values are different integer multiples of the predetermined alignment width constraint, generate the first aligned BLT command such that the first aligned BLT command specifies the second surface pointer value for one of the surfaces associated with the first aligned BLT command, and generate the second aligned BLT command such that the second aligned BLT command specifies the third surface pointer value for one of the surfaces associated with the second aligned BLT command. In some cases, the second BLT region may include even lines of the first BLT region, and the third BLT region may include odd lines of the first BLT region.

In further examples, the unaligned BLT command specifies a first BLT region. In such examples, CPU 6 may determine a second BLT region and a third BLT region based on the first BLT region, the second BLT region being different than the third BLT region, generate the first aligned BLT command such that the first aligned BLT command specifies the second surface width, the second surface pointer value, and the second BLT region, and generate the second aligned BLT command such that the second aligned BLT command specifies the second surface width, the third surface pointer value, and the third BLT region. In some cases, the second BLT region may include even lines of the first BLT region, and the third BLT region may include odd lines of the first BLT region.

The techniques described herein can be extended to surfaces where more than two surface lines are grouped together to form a single line of a virtual surface. For example, when N surface lines are grouped together, a single unaligned BLT command may be converted to N aligned BLT commands, where N is an integer greater than or equal to two.

In cases where more than two surface lines are grouped together, if a surface pointer of one of the unaligned surfaces for the unaligned BLT command is unaligned, CPU 6 may generate two different virtual surfaces (similar to FIG. 9) where a first virtual surface has an aligned surface pointer that is less than the unaligned surface pointer, and a second virtual surface has an aligned surface pointer that is greater than the unaligned surface. CPU 6 may assign one of the two virtual surfaces to each of the N BLT commands in a fashion that ensures that the surface lines that are access during a particular BLT command do not wrap around the edges of the assigned virtual surface.

In some examples, the techniques of this disclosure may be used to service BLT operations that perform scaling and/or filtering. In such examples, read engine 38 may not be alignment-constrained while write engine 40 may be alignment-constrained.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
    converting, with one or more processors, an unaligned block transfer (BLT) command into multiple aligned BLT commands, wherein the unaligned BLT command specifies a first surface width for at least one of the surfaces associated with the unaligned BLT command and a first BLT region, the at least one of the surfaces corresponding to a two-dimensional array of pixel data, and wherein converting the unaligned BLT command comprises:
        determining a second surface width based on the first surface width, wherein the second surface width is N times the first surface width, where N is an integer greater than or equal to two; and
        generating the multiple aligned BLT commands such that each of the multiple aligned BLT commands specifies the second surface width for at least one of the surfaces associated with each of the multiple aligned BLT commands, the multiple aligned BLT commands specifying:
            a source virtual surface and a destination virtual surface, the source virtual surface and the destination virtual surface each specifying the second surface width, and
            a plurality of source regions associated with the aligned source virtual surface and a plurality of destination regions associated with the aligned destination virtual surface, the plurality of source regions created by splitting the first BLT region associated with the unaligned BLT command into a plurality of non-contiguous regions associated with one or more of the multiple aligned BLT commands.

2. The method of claim 1, wherein determining the second surface width comprises determining the second surface width based on the first surface width and a predetermined alignment width constraint associated with a processor that executes the multiple aligned BLT commands.

3. The method of claim 2, wherein the first surface width is not an integer multiple of the predetermined alignment width constraint, and wherein determining the second surface width based on the first surface width and the predetermined alignment width constraint comprises determining the second surface width such that the second surface width is an integer multiple of the predetermined alignment width constraint.

4. The method of claim 1, wherein N equals 2.

5. The method of claim 1, wherein the multiple aligned BLT commands comprise a first aligned BLT command and a second aligned BLT command, wherein generating the multiple aligned BLT commands comprises:
    determining a second BLT region and a third BLT region based on the first BLT region, the second BLT region being different than the third BLT region;
    generating the first aligned BLT command such that the first aligned BLT command specifies the second BLT region; and
    generating the second aligned BLT command such that the second aligned BLT command specifies the third BLT region.

6. The method of claim 5, wherein the second BLT region includes even lines of the first BLT region, and the third BLT region includes odd lines of the first BLT region.

7. The method of claim 1, wherein the unaligned BLT command specifies a first surface pointer value for a first surface associated with the unaligned BLT command, and wherein generating the multiple aligned BLT commands comprises:
    generating the multiple aligned BLT commands such that each of the multiple aligned BLT commands specifies the first surface pointer value for one of the surfaces associated with each of the multiple aligned BLT commands.

8. The method of claim 7, wherein the multiple aligned BLT commands comprise a first aligned BLT command and a second aligned BLT command, wherein generating the multiple aligned BLT commands comprises:
determining a second BLT region and a third BLT region based on the first BLT region, the second BLT region being different than the third BLT region;
generating the first aligned BLT command such that the first aligned BLT command specifies the second surface width, the first surface pointer value, and the second BLT region; and
generating the second aligned BLT command such that the second aligned BLT command specifies the second surface width, the first surface pointer value, and the third BLT region.

9. The method of claim 8, wherein the second BLT region includes even lines of the first BLT region, and the third BLT region includes odd lines of the first BLT region.

10. The method of claim 1, wherein the unaligned BLT command specifies a first surface pointer value for a first surface associated with the unaligned BLT command, wherein the first surface pointer value is not an integer multiple of a predetermined alignment width constraint associated with a processor that executes the multiple aligned BLT commands, wherein the multiple aligned BLT commands comprise a first aligned BLT command and a second aligned BLT command, and wherein generating the multiple aligned BLT commands comprises:
determining a second surface pointer value and a third surface pointer value based on the first surface pointer value and the predetermined alignment width constraint such that the second and third surface pointer values are different integer multiples of the predetermined alignment width constraint;
generating the first aligned BLT command such that the first aligned BLT command specifies the second surface pointer value for one of the surfaces associated with the first aligned BLT command; and
generating the second aligned BLT command such that the second aligned BLT command specifies the third surface pointer value for one of the surfaces associated with the second aligned BLT command.

11. The method of claim 10, wherein the second surface pointer value is less than the first surface pointer value, and the third surface pointer value is greater than the first surface pointer value.

12. The method of claim 10,
wherein generating the multiple aligned BLT commands comprises determining a second BLT region and a third BLT region based on the first BLT region, the second BLT region being different than the third BLT region,
wherein generating the first aligned BLT command comprises generating the first aligned BLT command such that the first aligned BLT command specifies the second surface width, the second surface pointer value, and the second BLT region; and
wherein generating the second aligned BLT command comprises generating the second aligned BLT command such that the second aligned BLT command specifies the second surface width, the third surface pointer value, and the third BLT region.

13. The method of claim 12, wherein the second BLT region includes even lines of the first BLT region, and the third BLT region includes odd lines of the first BLT region.

14. A device comprising:
a memory configured to store block transfer (BLT) commands; and
one or more processors configured to:
convert an unaligned BLT command into multiple aligned BLT commands, wherein the unaligned BLT command specifies a first surface width for at least one of the surfaces associated with the unaligned BLT command, a first BLT region, and the at least one of the surfaces correspond to a two-dimensional array of pixel data;
determine a second surface width based on the first surface width, wherein the second surface width is N times the first surface width, where N is an integer greater than or equal to two;
and
generate the multiple aligned BLT commands such that each of the multiple aligned BLT commands specifies the second surface width for at least one of the surfaces associated with each of the multiple aligned BLT commands, the multiple aligned BLT commands specifying:
a source virtual surface and a destination virtual surface, the source virtual surface and the destination virtual surface each specifying the second surface width, and
a plurality of source regions associated with the aligned source virtual surface and a plurality of destination regions associated with the aligned destination virtual surface, the plurality of source regions created by splitting the first BLT region associated with the unaligned BLT command into a plurality of non-contiguous regions associated with one or more of the multiple aligned BLT commands.

15. The device of claim 14, wherein the one or more processors are further configured to determine the second surface width based on the first surface width and a predetermined alignment width constraint associated with a processor that executes the multiple aligned BLT commands.

16. The device of claim 15, wherein the first surface width is not an integer multiple of the predetermined alignment width constraint, and wherein the one or more processors are further configured to determine the second surface width such that the second surface width is an integer multiple of the predetermined alignment width constraint.

17. The device of claim 14, wherein N equals 2.

18. The device of claim 14, wherein the multiple aligned BLT commands comprise a first aligned BLT command and a second aligned BLT command and wherein the one or more processors are further configured to:
determine a second BLT region and a third BLT region based on the first BLT region, the second BLT region being different than the third BLT region;
generate the first aligned BLT command such that the first aligned BLT command specifies the second BLT region; and
generate the second aligned BLT command such that the second aligned BLT command specifies the third BLT region.

19. The device of claim 18, wherein the second BLT region includes even lines of the first BLT region, and the third BLT region includes odd lines of the first BLT region.

20. The device of claim 14, wherein the unaligned BLT command specifies a first surface pointer value for a first surface associated with the unaligned BLT command, and wherein the one or more processors are further configured to:
generate the multiple aligned BLT commands such that each of the multiple aligned BLT commands specifies the first surface pointer value for one of the surfaces associated with each of the multiple aligned BLT commands.

21. The device of claim 20, wherein the multiple aligned BLT commands comprise a first aligned BLT command and a second aligned BLT command and wherein the one or more processors are further configured to:
   determine a second BLT region and a third BLT region based on the first BLT region, the second BLT region being different than the third BLT region;
   generate the first aligned BLT command such that the first aligned BLT command specifies the second surface width, the first surface pointer value, and the second BLT region; and
   generate the second aligned BLT command such that the second aligned BLT command specifies the second surface width, the first surface pointer value, and the third BLT region.

22. The device of claim 21, wherein the second BLT region includes even lines of the first BLT region, and the third BLT region includes odd lines of the first BLT region.

23. The device of claim 14, wherein the unaligned BLT command specifies a first surface pointer value for a first surface associated with the unaligned BLT command, wherein the first surface pointer value is not an integer multiple of a predetermined alignment width constraint associated with a processor that executes the multiple aligned BLT commands, wherein the multiple aligned BLT commands comprise a first aligned BLT command and a second aligned BLT command, and wherein the one or more processors are further configured to:
   determine a second surface pointer value and a third surface pointer value based on the first surface pointer value and the predetermined alignment width constraint such that the second and third surface pointer values are different integer multiples of the predetermined alignment width constraint;
   generate the first aligned BLT command such that the first aligned BLT command specifies the second surface pointer value for one of the surfaces associated with the first aligned BLT command; and
   generate the second aligned BLT command such that the second aligned BLT command specifies the third surface pointer value for one of the surfaces associated with the second aligned BLT command.

24. The device of claim 23, wherein the second surface pointer value is less than the first surface pointer value, and the third surface pointer value is greater than the first surface pointer value.

25. The device of claim 23, wherein the one or more processors are further configured to:
   determine a second BLT region and a third BLT region based on the first BLT region, the second BLT region being different than the third BLT region,
   generate the first aligned BLT command such that the first aligned BLT command specifies the second surface width, the second surface pointer value, and the second BLT region; and
   generate the second aligned BLT command such that the second aligned BLT command specifies the second surface width, the third surface pointer value, and the third BLT region.

26. The device of claim 14, wherein the device comprises at least one of a wireless communication device and a mobile phone handset.

27. An apparatus comprising:
   means for receiving an unaligned block transfer (BLT) command;
   means for converting the unaligned BLT command into multiple aligned BLT commands, wherein the unaligned BLT command specifies a first surface width for at least one of the surfaces associated with the unaligned BLT command and a first BLT region, and the at least one of the surfaces correspond to a two-dimensional array of pixel data;
   means for determining a second surface width based on the first surface width, wherein the second surface width is N times the first surface width, where N is an integer greater than or equal to two;
   and
   means for generating the multiple aligned BLT commands such that each of the multiple aligned BLT commands specifies the second surface width for at least one of the surfaces associated with each of the multiple aligned BLT commands, the multiple aligned BLT commands specifying:
      a source virtual surface and a destination virtual surface, the source virtual surface and the destination virtual surface each specifying the second surface width, and
      plurality of source regions associated with the aligned source virtual surface and a plurality of destination regions associated with the aligned destination virtual surface, the plurality of source regions created by splitting the first BLT region associated with the unaligned BLT command into a plurality of non-contiguous regions associated with one or more of the multiple aligned BLT commands.

28. A non-transitory computer-readable storage medium storing instructions that, when executed, cause one or more processors to:
   convert an unaligned block transfer (BLT) command into multiple aligned BLT commands, wherein the unaligned BLT command specifies a first surface width for at least one of the surfaces associated with the unaligned BLT command and a first BLT region, and the at least one of the surfaces corresponding to a two-dimensional array of pixel data;
   determine a second surface width based on the first surface width, wherein the second surface width is N times the first surface width, where N is an integer greater than or equal to two;
   and
   generate the multiple aligned BLT commands such that each of the multiple aligned BLT commands specifies the second surface width for at least one of the surfaces associated with each of the multiple aligned BLT commands, the multiple aligned BLT commands specifying:
      a source virtual surface and a destination virtual surface, the source virtual surface and the destination virtual surface each specifying the second surface width, and
      a plurality of source regions associated with the aligned source virtual surface and a plurality of destination regions associated with the aligned destination virtual surface, the plurality of source regions created by splitting the first BLT region associated with the unaligned BLT command into a plurality of non-contiguous regions associated with one or more of the multiple aligned BLT commands.

\* \* \* \* \*